(12) United States Patent
Singer et al.

(10) Patent No.: US 11,145,931 B2
(45) Date of Patent: Oct. 12, 2021

(54) CONFIGURING LARGE CAPACITY BATTERIES

(71) Applicant: INTERNATIONAL BUSINESS MACHINES CORPORATION, Armonk, NY (US)

(72) Inventors: Noah Singer, White Plains, NY (US); Steven J. Ahladas, Highland, NY (US); Marc H. Coq, Hopewell Junction, NY (US); Richard J. Fishbune, Rochester, MN (US); Mark Maresh, Wake, NC (US); Eric B. Swenson, Pine Island, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 98 days.

(21) Appl. No.: 16/452,837

(22) Filed: Jun. 26, 2019

(65) Prior Publication Data

US 2020/0411811 A1 Dec. 31, 2020

(51) Int. Cl.
*H01M 10/48* (2006.01)
*H01M 50/256* (2021.01)
*H01M 10/42* (2006.01)
*H01M 50/502* (2021.01)

(52) U.S. Cl.
CPC ....... *H01M 50/256* (2021.01); *H01M 10/425* (2013.01); *H01M 10/482* (2013.01); *H01M 50/502* (2021.01); *H01M 2010/4271* (2013.01); *H01M 2010/4278* (2013.01)

(58) Field of Classification Search
CPC ............ H01M 10/425; H01M 10/482; H01M 2010/4271; H01M 2010/4278; H01M 2/1011; H01M 2/206
See application file for complete search history.

(56) References Cited

U.S. PATENT DOCUMENTS

| 7,301,249 B2 | 11/2007 | Stranberg et al. |
| 10,027,133 B2 | 7/2018 | Adrian et al. |

(Continued)

FOREIGN PATENT DOCUMENTS

| EP | 2212941 B1 | 8/2010 |
| EP | 2953183 A2 | 12/2015 |

(Continued)

*Primary Examiner* — Victoria H Lynch
(74) *Attorney, Agent, or Firm* — Gregory M. Nordstrom

(57) ABSTRACT

A battery comprises a plurality of battery modules. A method determines a load-state of the battery and selects a set of the battery modules to configure, to produce a load-state capacity of the battery based on the load-state. A load-state capacity of the battery can be a sub-capacity of the battery less than a rated capacity of the battery and the method can configure the set of battery modules to produce the sub-capacity based on the load-state comprising the battery disconnected from a load. A battery system can comprise a battery having a plurality of battery modules and a controller configured to perform the method. A battery system can comprise a battery having a plurality of battery modules, and an actuator and a module retainer that can position a battery module in or out of contact with a module interconnect.

19 Claims, 7 Drawing Sheets

(56) References Cited

U.S. PATENT DOCUMENTS

| | | |
|---|---|---|
| 2010/0250043 A1* | 9/2010 | Scheucher .............. B60L 53/11 |
| | | 701/22 |
| 2012/0092018 A1 | 4/2012 | Scheucher |
| 2013/0053909 A1* | 2/2013 | Elghazzawi ......... A61N 1/3975 |
| | | 607/5 |
| 2015/0357609 A1 | 12/2015 | Lang |
| 2016/0254687 A1 | 9/2016 | Tanaka et al. |
| 2018/0254651 A1 | 9/2018 | Hallmark et al. |
| 2018/0277802 A1 | 9/2018 | Sun et al. |
| 2018/0351144 A1 | 12/2018 | Huff |

FOREIGN PATENT DOCUMENTS

| | | |
|---|---|---|
| JP | 2012221844 A | 6/2015 |
| WO | 2019012515 A1 | 1/2019 |

* cited by examiner

CONFIGURING LARGE CAPACITY BATTERIES

BACKGROUND

The present disclosure relates to transporting batteries, and more specifically, to configuring a battery comprising a plurality of battery modules.

SUMMARY

According to embodiments of the present disclosure (hereinafter, "embodiments"), a battery can comprise a plurality of battery modules. The battery can have a rated capacity and each of the battery modules can have a partial capacity less than the rated capacity. A method can configure battery modules of the battery to produce a load-state capacity of the battery. The method includes determining a load-state of the battery and selecting, based on the load-state, a set of battery modules to configure to produce the load-state capacity of the battery. The method further includes configuring the set of battery modules to produce the load-state capacity of the battery.

In embodiments, configuring the battery modules to produce the load-state capacity can comprise disconnecting battery modules from the battery. A load-state, in an embodiment, can comprise the battery disconnected from a load and the method can configure the battery modules to produce a load-state capacity of the battery that comprises a sub-capacity less than the rated capacity of the battery. In embodiments, the capacities of the battery modules, the load-state capacity, the rated capacity, and the sub-capacity of the battery can comprise a voltage, a charge capacity, a current capacity, or a power capacity.

Embodiments can include a battery system comprising a battery and a controller. The battery can comprise a plurality of battery modules, the battery can have a rated capacity, and each of the battery modules can have a partial capacity less than the rated capacity. The controller can perform the method to produce a load-state capacity of the battery. In some embodiments, configuring the battery modules can comprise connecting a battery module to, and/or disconnecting a battery module from, the battery and the controller can use an electronic circuit to configure the battery modules. The battery system can determine that a load-state comprises the battery connected to a load and, based on the load-state, can configure the battery modules to produce the rated capacity of the battery. The battery system can further determine that a load-state comprises the battery disconnected from a load and, based on the load-state, can configure the battery modules to produce a sub-capacity of the battery.

In another battery system, the system can comprise a battery having a plurality of battery modules, the battery can have a rated capacity, and each of the battery modules can have a partial capacity less than the rated capacity. The system can further include an actuator, an actuated configuration of the actuator can position a battery module in contact with a module interconnect, and an unactuated configuration of the actuator can position a battery module out of contact with the module interconnect. The battery system can further include a module retainer that can maintain a battery module out of contact with the module interconnect. In some embodiments, the module retainer can comprise a spring.

The above summary is not intended to describe each illustrated embodiment or every implementation of the present disclosure.

BRIEF DESCRIPTION OF THE DRAWINGS

The drawings included in the present disclosure (hereinafter, "the disclosure") are incorporated into, and form part of, the specification. They illustrate example embodiments of the disclosure and, along with the description, serve to explain the principles of the disclosure. The drawings are only illustrative of certain embodiments and do not limit the disclosure.

Figure 1:
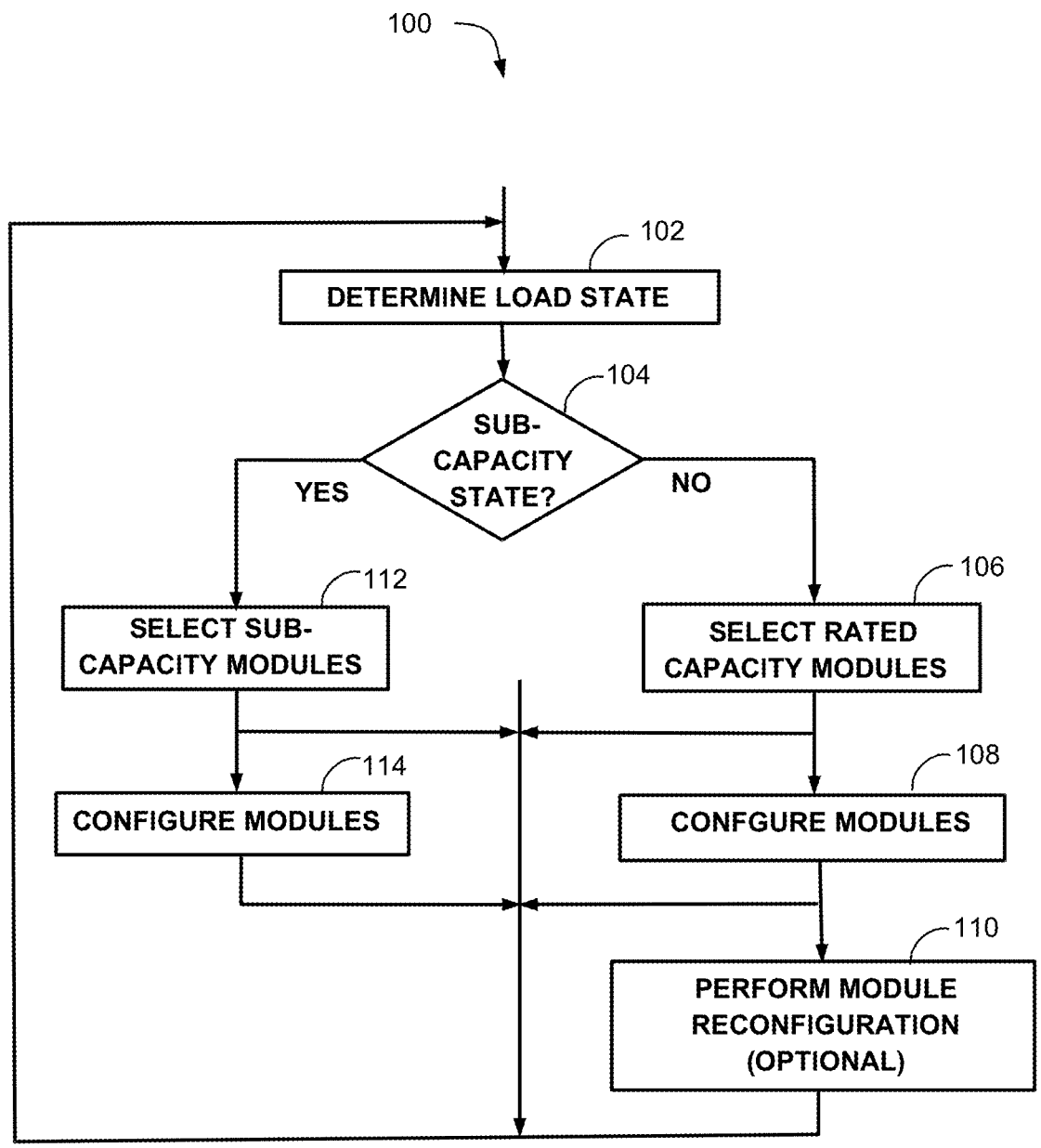
FIG. 1 illustrates an example method to configure battery modules of a battery, according to aspects of the disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure (hereinafter, "the disclosure") relate to batteries and battery systems. More particular aspects relate to configuring battery modules within a battery and battery system to produce a capacity of the battery. While the present disclosure is not necessarily limited to such applications, various aspects of the disclosure may be appreciated through a discussion of example embodiments of the disclosure (hereinafter, "embodiments") using this context.

Electrical and/or electronic devices commonly employ batteries to provide electrical power to those devices. In embodiments such devices can comprise an electrical "load" that can consume power from, and/or provide electrical charge to, a battery. In an embodiment a load can be coupled to, and/or be included in, a "load device", which can operate with the load to draw power from, and/or provide electrical charge to, a battery coupled (e.g., connected) to the load and/or load device. For example, in an embodiment a load can comprise a computing device and a load device can comprise another device, such as a power system of a computer, coupled to the computing device, and/or that includes the computing device (e.g., a computing system).

In embodiments, a load, and/or load device, can comprise any device that can use power from a battery, and/or provide charge to a battery. For example, a load, and/or load device, can be a computer, (e.g., a tablet, laptop, desktop, or mainframe computer), a computing system (or, a component of a computing system, such as a network gateway), a direct current (DC) to alternating current (AC) inverter, an electrically power vehicle, or an electric motor or generator. As used herein, "load" refers interchangeably to a load, as just described, and a load device that can be coupled to and/or include a load.

In embodiments the battery can provide power to, and/or receive electrical charge from, a load according to particular electrical requirements, such as the voltage at which the battery provides power to a device, and/or a capacity of the battery. As used herein, "capacity" of a battery refers to a capacity of a battery to provide electrical power to, and/or receive an electrical charge from, a load. For example, in embodiments a capacity can be a capacity of the battery to accept and/or store electrical charge; a capacity of the battery to provide current over a period of time, such as measured in Ampere-hours (Ah); and/or a capacity of the battery to provide an amount of power over a period of time, such as measured in Watt-hours (Wh). As used herein, "power capacity" refers to a capacity of a battery to provide a particular amount of current (e.g., a particular Ah of current), and/or to provide a particular amount of power (e.g., a particular Wh of power).

In embodiments batteries can comprise one or more storage cells (i.e., structural or chemical units to store electrical charge), and/or various electrical and/or chemical technologies, to store electrical charge and/or provide electrical power to a device. For example, in embodiments batteries can comprise lead/acid cell, Nickel/Metal/Hydride (NiMH), and/or Lithium Ion (Li) technologies; although, these example technologies are not intended to limit embodiments.

Batteries using such technologies can be subject to regulatory controls, such as government and/or commercial regulatory standards and/or requirements. Regulatory controls can be associated with particular properties of a battery, such as its chemical composition, particular electrical properties of the battery, and/or a particular configuration of its components (e.g., a configuration of storage cells). Such regulatory controls can, for example, govern storage and/or transport of batteries. Such regulatory controls can include certifying that a regulated battery meets particular safety and/or physical requirements, and/or can include specifications governing methods of packaging, handling, and/or transportation a battery.

In embodiments, a battery can have a "rated" property, such as an operating voltage, operating temperature, and/or or a power capacity of the battery. A rated property of a battery can correspond to a total, or maximum, a value of a property, such as a total, or maximum, voltage and/or power capacity. For example, a lithium battery can have a rated power capacity (e.g., 100 Wh) and, based on that rated power capacity, the battery can be classified under government and/or commercial regulations as a hazardous material and, consequently, can be subject to corresponding regulatory controls. Such regulatory controls can increase cost and/or complexity of designing, handling, storing, and/or transporting a battery.

Accordingly, in embodiments it can be advantageous to design, and/or utilize, a battery that can be configurable to have, in one configuration, a value of a rated property at, or exceeding, a regulated value of that property and to have, in a second configuration, a value of that rated property less than the regulated value, such that the value of rated property, in this second configuration of the battery, does not subject the battery to regulatory classifications and/or controls. For example, in an embodiment a battery can have a nominal, or "rated "capacity and, correspondingly, a configurable battery can have a "rated capacity" configuration and a "sub-capacity" configuration. In the rated capacity configuration, the battery can have a rated capacity (e.g., a current and/or power capacity) that may be at, or exceed, a regulatory limit and, in the sub-capacity configuration, the battery can have a capacity value less than that regulatory limit.

To configure a battery with such variable properties, in an embodiment a battery can comprise a plurality of battery modules that can store electrical charge (e.g., in battery cells of a battery module). Each module can have a particular set of electrical properties, such as those previously described (e.g., a voltage or a charge, current, and/or power capacity). In embodiments, the battery modules can have a "module capacity" less than the rated capacity of the battery, the battery modules can be configured to produce a particular capacity of a battery, and the capacity can comprise a combination of the module capacities (e.g., a cumulative sum of the capacities) of individual battery modules configured to produce that particular sub-capacity of the battery. The combined module capacity of battery modules can produce, for example, a capacity of the battery less than the rated capacity (e.g., a sub-capacity).

In embodiments, "configuring" battery modules of a battery can comprise, for example, connecting the modules to, and/or disconnecting the modules from, each other, a source of charging power, and/or the battery. As used herein, "connect" refers to electrically coupling elements of a battery system, such that one element (e.g., a battery module) can provide electrical power to, and/or receive electrical charge from, another element of the battery (e.g., another battery module, the battery, and/or a load), and "disconnect" refers to electrically de-coupling elements of a battery system, such that one element (e.g., a battery module) does not provide electrical power to, and/or receive electrical charge from, another element of the battery. Accordingly, as used herein, to "configure" battery modules means to connect and/or disconnect battery modules to or from each other, a source of charging power, and/or the battery.

In embodiments a method of configuring a battery can configure the battery modules to produce particular properties of the battery, such as to configure the battery modules in a rated capacity configuration that can produce a rated capacity of the battery, and to configure the battery modules in a sub-capacity configuration that can produce a sub-capacity of the battery. In embodiments, in a rated capacity configuration the battery can have a total capacity (e.g., a total power capacity), and the total capacity can be a "regulated capacity" subject to regulatory controls. Correspondingly, in embodiment, in a sub-capacity configuration the battery can have an "unregulated capacity", which can be less than a regulated capacity.

For example, government regulations can classify a lithium battery that has a rated power capacity of 100 Wh (or more) as hazardous and subject to corresponding regulatory controls. In an embodiment, such a lithium battery can comprise a plurality of lithium battery modules. Each such battery module can have a rated power capacity less than 100 Wh, such that the individual battery modules—and, the battery, with the modules configured in a sub-capacity configuration—are not subject to the 100 Wh regulatory controls. In an embodiment, a method can configure (e.g., connect in electrical series and/or parallel) the battery modules in a rated capacity configuration, in which the battery can have a rated power capacity of 100 Wh (or, more) accumulated from the connected combination of battery modules. An embodiment can configure the battery to have such a rated capacity, for example, to provide power from the battery to a load, such as when the battery is installed in a device or system to provide power a load.

In embodiments the method can configure (e.g., connect or disconnect) the battery modules in sub-capacity configuration, in which the battery, as whole, has a power capacity less than a regulated power capacity (e.g., 100 Wh), such that the battery, in the sub-capacity configuration, is not subject to the regulatory controls. In embodiments the method can configure the battery to have such a sub-capacity, for example, when the battery is not installed in, or is to be removed from, a device to provide power to a load, and/or to prepare a battery for transport or storage. Additionally, in embodiments, the method can configure battery modules in the sub-capacity configuration when the battery is not providing power to, and/or receiving charge from a load, such as to reduce, or eliminate, power leakage from one battery module to another, and/or from a battery module to the battery and/or a load connected to the battery.

FIG. 1 illustrates example method 100 of an embodiment to configure battery modules of a battery in a rated capacity configuration and a sub-capacity configuration. In embodiments, a sub-capacity configuration can be any configuration (e.g., electrical series and/or parallel connections) of the battery modules that produces a capacity of the battery less than a rated (e.g., a total) capacity of the battery. In embodiments, a sub-capacity configuration can be, for example, an unregulated capacity configuration.

As previously described, in embodiments of the method configuring the battery modules can comprise connecting one or more battery modules in series, parallel, or a combination of series and parallel, electrical connections or circuits. Configuring the battery modules, in an embodiment of the method, can additionally, or alternatively, comprise disconnecting one or more battery modules from a series, parallel, or combination of series and parallel, electrical connection or circuit.

For purposes only of illustrating the disclosure, but not intended to limit embodiments, the method is described as performed by a battery system utilizing a battery comprising a plurality of battery modules. However, it would be apparent to one of ordinary skill in the art that alternative embodiments can perform the method, including embodiments utilizing alternative battery compositions and/or configurations, and/or employing automated systems and/or human (e.g., human manual) operations.

Referring to FIG. 1, at 102 of example method 100 the battery system determines a "load-state" of the battery. As previously described, in an embodiment a load-state can comprise a state of the battery coupled (e.g., connected) to a load, and/or a state of the battery de-coupled (e.g., disconnected) from a load. Embodiments can determine, for example, at 102, a load-state that comprises the battery connected by terminals of the battery (e.g., a positive and/or negative voltage terminal) to a load. Embodiments can determine that a load-state comprises the battery coupled to a load and actively providing power to the load, coupled to a load in a "standby state" ready to provide power to a load, and/or coupled to a load to receive power from the load, such as to charge the battery (e.g., store electrical charge in storage elements of the battery). As used herein, "connected load-state" refers to any state of a battery in which the battery is electrically coupled to a load so as to be able to provide electrical power to the load. Conversely, an embodiment can determine that a load-state comprises a battery de-coupled (e.g., disconnected) from a load, such as the battery configured to not provide power to a load, and/or to not receive charge from a load. For example, a battery can be de-coupled from a load in order to transport or store the battery. As used herein, a "disconnected load-state" refers to any state of a battery in which the battery is electrically de-coupled from a load so as to not be able to provide power to the load.

In an embodiment, at 102 the battery system can determine a load-state by a variety of means. For example, a battery system can include a communications interface (e.g., a set of signal wires, and/or a wireless interface) and can receive (e.g., from the load and/or a load device), by means of the communications interface, data indicating that the battery is connected to (or, alternatively, disconnected from) a load. In another example, a battery system can include an electronic circuit that can detect that the battery is connected to (and/or disconnected from) a load, such as a circuit that can detect a connection (and/or disconnection) of a positive and/or negative terminal of the battery to a load, and/or that can detect a load providing electrical charge to store in the battery.

As used herein, the term "sub-capacity load-state" means a state and/or configuration of a battery, and/or load, in which the battery is preferably configured to have a capacity less than the rated capacity (i.e., a sub-capacity). Such sub-capacity load-states include (but, are not necessarily limited to) a state and/or configuration of the battery and/or load: (1) to prepare the battery for storage or transport; (2) to produce a sub-capacity of the battery less than a regulatory limit to the capacity of the battery; (3) in which a battery module of the battery is at a capacity less than a rated capacity of the module (i.e., a "low capacity"); and, (4) in which the battery is not installed in, or is electrically disconnected from, a load and/or a device, or system, that includes a load. Correspondingly, as used herein, the term "rated capacity load-state" means a state and/or configuration of a battery, and/or load, in which the battery is preferably configured to have a capacity at least that of the rated capacity. Such states and configurations include (but are not limited to): the battery electrically coupled to a load and actively providing power to the load at or above the rated capacity of the battery, and the battery electrically coupled to prepare the battery to provide power to the load at or above the rated capacity of the battery.

In embodiments a "load-state capacity" of a battery can correspond to a load-state, such as a load-state determined at 102. For example, in an embodiment a load-state can comprise a state of the battery connected to a load, and a corresponding load-state capacity can comprise a rated (e.g., a total) capacity of the battery, and/or a sub-capacity of the battery. In an embodiment, a load-state of the battery corresponding to a rated capacity of the battery can comprise, for example, the battery connected to a load that requires the rated capacity of the battery to provide power to the load.

In another example, a load-state can comprise a state of the battery disconnected from a load, and a corresponding load-state capacity can comprise a sub-capacity of the battery. Alternatively, in an embodiment a load-state of the battery can comprise the battery connected to a load that requires a capacity of the battery less than a rated capacity of the battery, and a corresponding load-state capacity can comprise a sub-capacity of the battery based on the capacity required by that load. Accordingly, solely to illustrate the disclosure, but not intended to limit embodiments, at 104 of example method 100 the battery system determines if a load-state capacity, corresponding to a load-state determined at 102, corresponds to a sub-capacity state of the battery.

If, at 104, the battery system determines that the load-state does not correspond to a sub-capacity of the battery (e.g., the battery system determines, at 104, that a load-state of the battery requires a rated capacity of the battery), at 106 the battery system determines capacity of the battery corresponding to the load-state determined at 102 (e.g., a capacity at or, above, a rated capacity) and selects a set of battery modules to configure to produce that capacity. For example, in an embodiment the battery system can select a set of battery modules to configure to produce a rated capacity (e.g., a rated voltage, charge, current, and/or power capacity) of the battery.

In an embodiment a battery system (e.g., a processor or controller of a battery system) can select particular battery modules to configure (e.g., to connect to each other and/or the battery) based on properties of those modules (e.g., their particular voltage and/or power capacity), and/or a relationship of properties of the battery modules to properties of the battery and/or load. For example, in an embodiment a lithium battery can comprise 4 lithium battery modules, each module having a power capacity of 25 Wh. In such an embodiment, based on a load-state determined at 102, at 106 the battery system can select all 4 battery modules to configure (e.g., connect to the battery) to produce a cumulative, rated capacity of 100 Wh of the battery.

In another illustration of this example, in an alternative embodiment a lithium battery can comprise 4 lithium battery modules, in which two of the battery modules have a power capacity of 50 Wh and two of the battery modules have a power capacity of 25 Wh. In such an embodiment, based on a load-state determined at 102, at 106 the battery system can select one of the 50 Wh battery modules and both of the 25 Wh battery modules to produce a cumulative, rated 100 Wh power capacity of the battery. Alternatively, in such an embodiment, based on a load-state determined at 102, at 106 the battery system can select both of the 50 Wh battery modules, and neither of the 25 Wh battery modules, to produce a cumulative, rated 100 Wh power capacity of the battery.

These examples are not intended, however, to limit embodiments. It would be apparent to one of ordinary skill in the art that, based on a load-state determined at 102, at 106 an embodiment can select a set of battery modules to configure according to a variety of criteria, and the criteria can be associated with properties of the particular battery modules, methods and/or means of configuring the battery modules, regulatory controls and/or properties of the battery associated with regulatory controls, and/or properties of a load coupled to a battery.

At 108 the battery system configures the battery modules, selected at 106, to produce the rated capacity. In embodiments, a battery system can utilize, for example, electrical and/or mechanical devices to configure the battery modules. As previously described, in embodiments configuring the battery modules, at 108, can comprise a battery system connecting a set of battery modules in series and/or parallel electrical connections. The electrical connections can produce a particular rated voltage and/or a particular power capacity of the battery, which can be the cumulative voltage and/or power capacities of the individual battery modules in the set of battery modules.

At 110, a battery system can, optionally, perform a method to dynamically re-configure the battery modules, such as in response to changes in the load, battery modules, and/or load-state of the battery. Subsequent description of FIG. 2 will illustrate an example reconfiguration method, 200, which an embodiment can perform at 110. In embodiments a battery system can continue to perform operation 102, in combination with, and/or subsequent to, performing operations 106, 108, and/or 110.

If, at 104, the battery system determines that the load-state corresponds to a sub-capacity of the battery, at 112 the battery system determines a sub-capacity of the battery, corresponding to the load-state determined at 102, and selects a set of battery modules to configure to produce that sub-capacity. As previously described, in embodiments a sub-capacity can comprise a capacity of the battery less than, for example, a regulated capacity of the battery. For example, in an embodiment a sub-capacity can be a power capacity (e.g., a power capacity measured in Watt-hours) less than a regulated power capacity. In particular, in embodiments a battery system can select battery modules to produce a sub-capacity of a battery less than a regulated capacity. Using again the example of a lithium battery, in an embodiment at 112 a battery system can select battery modules of the battery produce a power sub-capacity of the battery less than a regulated power capacity of 100 Wh.

At 112, in an embodiment, a battery system can select particular battery modules to configure (e.g., connect electrically) based on properties of those modules (e.g., their particular voltage, power capacity, and/or a status of their electrical charge), and/or a relationship of properties of the battery modules to properties of the battery under conditions that the battery is not coupled to a load. For example, based on a load-state determined at 102, in an embodiment a battery system can select, at 112, battery modules that cumulatively produce a particular voltage and/or power capacity of the battery less than a rated capacity of the battery. To further illustrate this example, in an embodiment a lithium battery can comprise 4 lithium battery modules each having a power capacity of 25 Wh. In such an embodiment, at 112 a battery system can select 2 of the battery modules to produce a power sub-capacity the battery of 50 Wh, or 3 of the battery modules to produce a power sub-capacity of the battery of 75 Wh, both of which can be less than a regulated power capacity of 100 Wh.

However, these examples are not intended to limit embodiments. It would be apparent to one of ordinary skill in the art that, at 112, an embodiment can select battery modules to configure according to a variety of criteria, and the criteria can be associated with properties of the particular battery modules, methods and/or means of configuring the battery modules, regulatory controls and/or properties of the battery associated with regulatory controls, and/or properties of a battery when not coupled to a load.

At 114, the battery system configures battery modules, selected at 112, to produce the sub-capacity of the battery. As previously described in reference to operation 108, in embodiments, at 114, a battery system can utilize, for example, electrical and/or mechanical devices to configure the battery modules. Additionally, in embodiments a battery system can continue to perform 102, in combination with, and/or subsequent to, performing operations 112 and/or 114.

In embodiments, configuring the battery to have the sub-capacity can comprise, for example, electrically connecting to the battery (and/or to each other) battery modules selected at 112, such as described in reference to operation 108. Additionally, or alternatively, configuring battery modules, at 114, in an embodiment can comprise disconnecting from the battery, and/or each other, battery modules selected at 112 (e.g., one or more previously connected battery modules, such as modules previously connected to each other and/or the battery by means of operations 108 and/or the optional reconfiguration method at 110). For example, in an embodiment a battery can comprise 3 battery modules each having a power capacity of 40 Wh, and the battery system can configure the 3 modules to produce a power capacity (e.g., a rated power capacity) of the battery of 120 Wh (e.g., the cumulative power capacity of the 3 battery modules). To produce a sub-capacity of the battery less than the 120 Wh capacity (e.g., less than a 100 Wh regulated power capacity of a lithium battery), in an embodiment the battery system can select, at 112, and electrically disconnect, at 114, one or more of the 3 battery modules from the battery and/or other modules of the battery.

Figure 2:
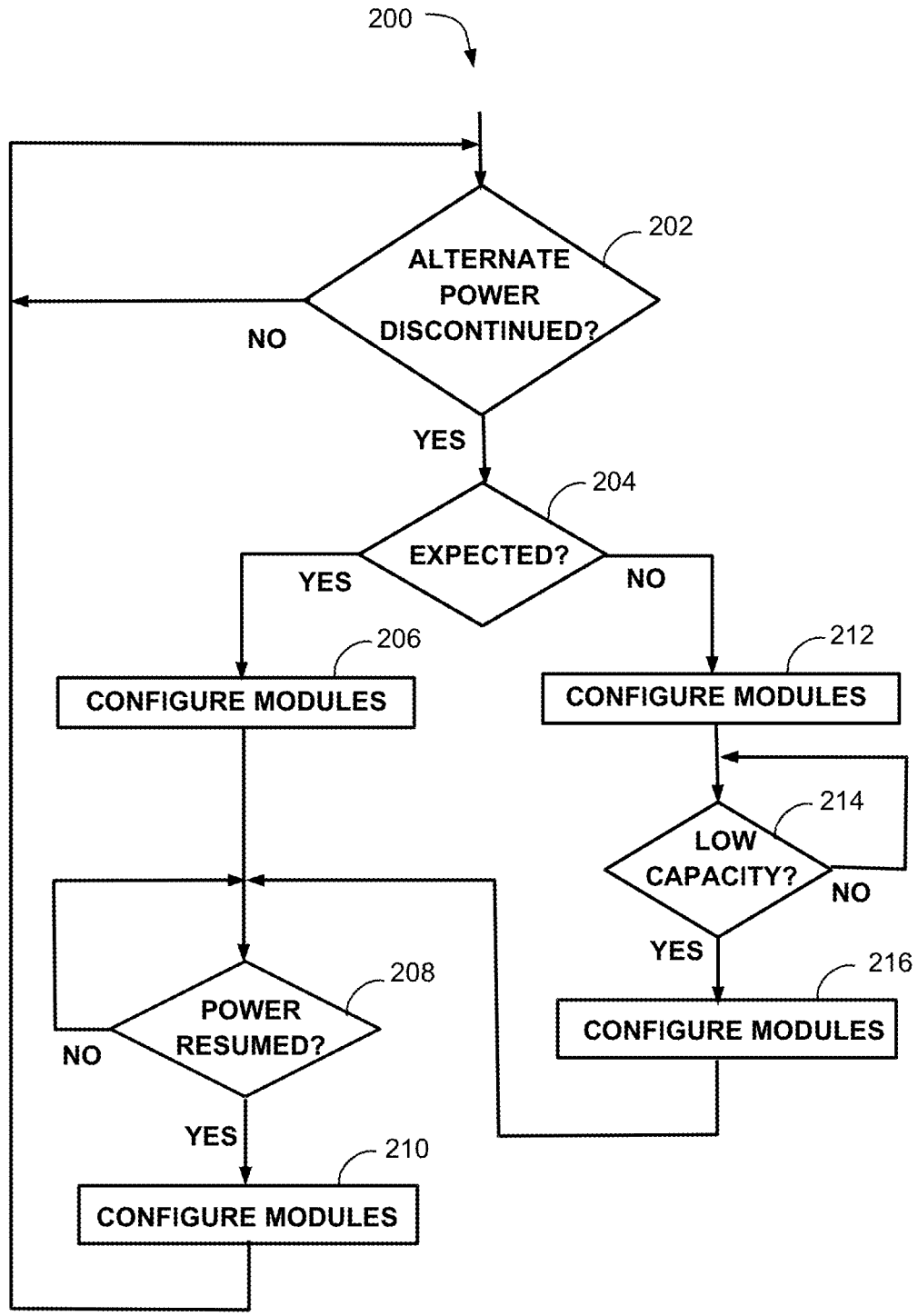
FIG. 2 illustrates a second example method to configure battery modules of a battery, according to aspects of the disclosure.

As previously described, at 110 an embodiment can, optionally, perform a method to dynamically re-configure battery modules of a battery, such as in response to changes in a load-state (e.g., a change in a load and/or coupling of the battery to a load). Accordingly, FIG. 2 illustrates example method 200 to dynamically reconfigure battery modules of a battery, such as may be performed at 110 of method 100, to produce a load-capacity of a battery corresponding to dynamic changes in a load-state of the battery. As in the example of method 100, for purposes only of illustrating the disclosure, but not intended to limit embodiments, method 200 is described as performed by a battery system utilizing a battery comprising a plurality of battery modules, and utilizing electrical and/or mechanical devices capable of configuring the battery modules. However, it would be apparent to one of ordinary skill in the art that alternative embodiments can perform the method, including embodiments utilizing alternative battery compositions and/or configurations, and/or employing automated and/or human (e.g., human manual) operations.

In embodiments, a load can receive power from an alternate power source (i.e., a power source other than the battery) in addition to, or alternative to, a battery coupled to the load. For example, in an embodiment, a load can receive utility power and a battery coupled to the load can concurrently provide power to the load or, alternatively, the battery can be in a standby, and/or charging, state such that the battery is not instantly providing power to the load. Accordingly, at 202, the battery system monitors the load to determine that the load has discontinued use of alternative (e.g., utility) power. In embodiments, a load can discontinue use of alternate power, for example, as a result of loss of (or, disconnection from) an alternate power source, or can perform an operation (e.g., a power off operation) to discontinue use of an alternate power source.

At 202, an embodiment can utilize, for example, an electrical (or, electronic) circuit, and/or a processor, to determine that the load has discontinued use of alternate power. In another example, in an embodiment, at 202 a battery system can receive an electronic signal, and/or a data communication (e.g., via a communications interface, such as a wireless interface), to determine that the load has discontinued use of alternate power. If, at 202, the battery system determines that the load has not discontinued use of alternate power, the battery system can continue, at 202, to monitor the load.

Alternatively, if the battery system determines, at 202, that the load has discontinued use of alternate power, at 204 the battery system can determine if the discontinuation is expected. For example, in an embodiment, at 204 a battery system can determine that a load has discontinued use of alternate power as a result of a power down (or, power off) operation of the load and, accordingly, that the discontinuation is expected.

To further illustrate this example, in an embodiment a load can comprise a component of a computing system, such as a mainframe computer, a storage system, or a network gateway, and the load can operate normally using utility (e.g., Alternating Current, or AC) power. A battery can operate normally, for example, in a standby state, as a backup power source for a load. In this example, a battery system can determine, at 204, that the load discontinuing use of utility power is a result of the load (e.g., a mainframe computer) performing a power off operation and, accordingly, is expected. Alternatively, in this example, the battery system can determine, at 204, that the load has discontinued using the utility power as a result of a loss of utility power to the load and, accordingly, that the discontinuation is not expected.

In embodiments, a battery system can determine, at 204, that the discontinuation is expected utilizing, for example, an electronic circuit coupled to the load, battery, and/or battery system; and/or utilizing an electronic or electrical signal, and/or data communication, received by the battery system (e.g., a signal and/or data communication received from the load and/or alternate power source). However, this is not intended to limit embodiments, and it would be apparent to one of ordinary skill in the art to employ a variety of alternative means and/or methods for a battery system to determine, at 204, that a load discontinuing use of an alternate power source is or, alternatively, is not expected.

If, at 204, the battery system determines that the discontinuation of alternate power is expected, at 206 the battery system can configure battery modules of the battery accordingly. For example, in an embodiment, at 206 the battery system can determine that the load does not require power from the battery and, accordingly, can configure battery modules of the battery to disconnect the modules from the battery, such as to configure the battery to a sub-capacity.

At 208, the battery system determines if the load has resumed use of alternate power. At 208, an embodiment can utilize, for example, an electrical (or, electronic) circuit to determine that the load has resumed use of alternate power. In another example, in an embodiment, at 208 a battery system can receive an electronic signal, or a data communication (e.g., via a communications interface, such as a wireless interface), to determine that the load has resumed use of alternate power.

If, at 208, the battery system determines that the load has not resumed use of alternate power, the battery system can continue, at 208, to monitor the load, and/or the alternate power, to determine that the load has resumed use of alternate power. Alternatively, if the battery system determines, at 208, that the load has resumed use of alternate power, at 210 the battery system configures battery modules of the battery accordingly. For example, in an embodiment, at 210 the battery system can determine that the load does not require power from the battery and, accordingly, can reconfigure battery modules of the battery to disconnect modules from the battery or, alternatively, to connect modules to the battery, such as configure the battery in a standby state, to provide charge to one or more battery modules, and/or to provide a capacity to the load in addition to the alternate power. The battery system can repeat monitoring, at 202, use of an alternate power source by the load in conjunction with, or subsequent to, operation 208.

Returning to operation 204, if the battery system determines, at 204, that discontinuation of alternate power to, or use by, the load is unexpected, at 212 the battery system configures battery modules of the battery accordingly. For example, in an embodiment, at 206 the battery system can determine that, as a result of the unexpected discontinuation of alternate power to the load, the load requires power from the battery and, accordingly, can configure battery modules of the battery to connect the modules to the battery, such that the battery is configured to provide power to the load (e.g., configured in a rated capacity configuration) in the absence of the alternate power.

In this example, an embodiment can configure battery modules of the battery to provide power to the load, for example, corresponding to a particular voltage, or a particular current and/or power capacity. In embodiments, at 212 a battery system can configure battery modules to produce a rated capacity of the battery, such as to provide power to the load while the load has experienced loss of alternate power. Alternatively, at 212 an embodiment can configure battery modules to produce a sub-capacity of the battery, such as a sub-capacity less than a regulated capacity (e.g., in the event that a battery is configured to provide power to a load while the load, in combination with the battery, is subject to transport, or storage, regulations).

At 214, the battery system monitors the battery to determine if the battery, and/or battery modules of the battery, have reached, and/or, are approaching, a low capacity (e.g., a low or reduced power capacity, and/or a low or reduced charge) state. As used herein, "low capacity state" refers to a state of the battery, and/or one or more battery modules, having, or approaching, a low capacity. In an embodiment, at 214 a battery system can utilize an electrical, and/or electronic circuit, and/or a processor, to monitor the state of battery modules, and/or the battery as a whole.

If the battery system determines, at 214, that the battery, and/or battery modules of the battery, are not at, or are not approaching, a low capacity state, the battery system can continue, at 214, to monitor states of the battery, and/or battery modules of the battery. Alternatively, If the battery system determines, at 214, that the battery, and/or battery modules of the battery, are at, or are approaching, a low capacity state, at 216 the battery system configures the battery modules accordingly.

For example, in an embodiment, at 216 the battery system can configure the battery modules to disconnect particular battery modules (e.g., battery modules that are individually at, or approaching, a low capacity state) from the battery or, alternatively, to disconnect all of the battery modules of the battery from the battery. In an embodiment, at 216 a battery system can configure battery modules of the battery to receive charge from a power source, such as the alternate power source previously coupled to the load or, alternatively, another power source. At 208, the battery system monitors the load and/or alternate power source, as previously described.

While example method 200 illustrates a method for reconfiguring modules of a battery in response to a load discontinuing use of alternate power, this is only for purposes of illustrating the disclosure and not intended to limit embodiments. It would be apparent to one or ordinary skill in the art that an embodiment can perform reconfiguring battery modules of a battery, such as at operation 110 of example method 100 in FIG. 1, and/or in operations of example of method 200 of FIG. 2, in response to any of a variety of changes in load-state of a battery and/or a load.

For example, batteries can have particular thermal properties, such as a temperature associated with charging a battery and/or battery modules of a battery (as used herein, "charging" refers to a state of a battery in which it is receiving electrical charge to store), a temperature associated with transport and/or storage of a battery, and/or a temperature associated with the battery providing power to a load. Embodiments can employ a method, such as example method 100 of FIG. 1 and/or example method 200 of FIG. 2, to configure battery modules (e.g., electrically connect modules to and/or disconnect modules from the battery) in response to, and/or to establish, particular thermal properties of a battery and/or battery modules, such as a temperature of the battery and/or particular modules of the battery.

As described in reference to the example methods of FIGS. 1 and 2, embodiments can comprise a battery having a plurality of battery modules, and a battery system can perform methods to configure the battery modules to produce a load-capacity of a battery corresponding to a load-state of the battery. Accordingly, FIG. 3A illustrates example battery module 300 such as can be utilized in embodiments, and FIG. 3B illustrates example battery system 320, which can utilize battery modules such as the example of FIG. 3A.

Figure 3A:
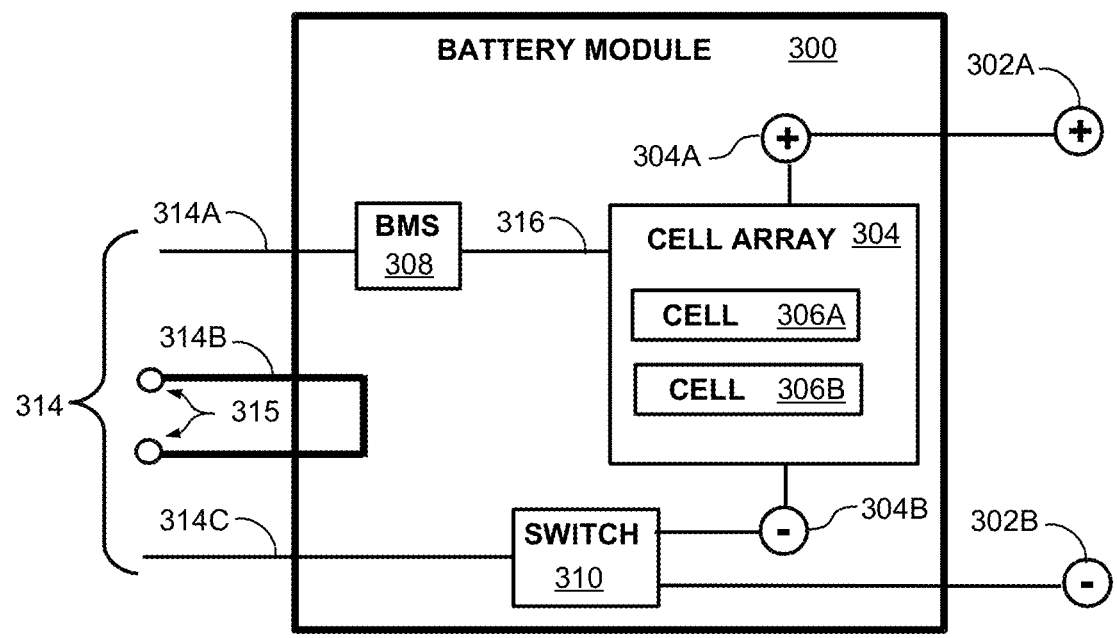
FIG. 3A illustrates an example battery module, according to aspects of the disclosure.
Figure 3B:
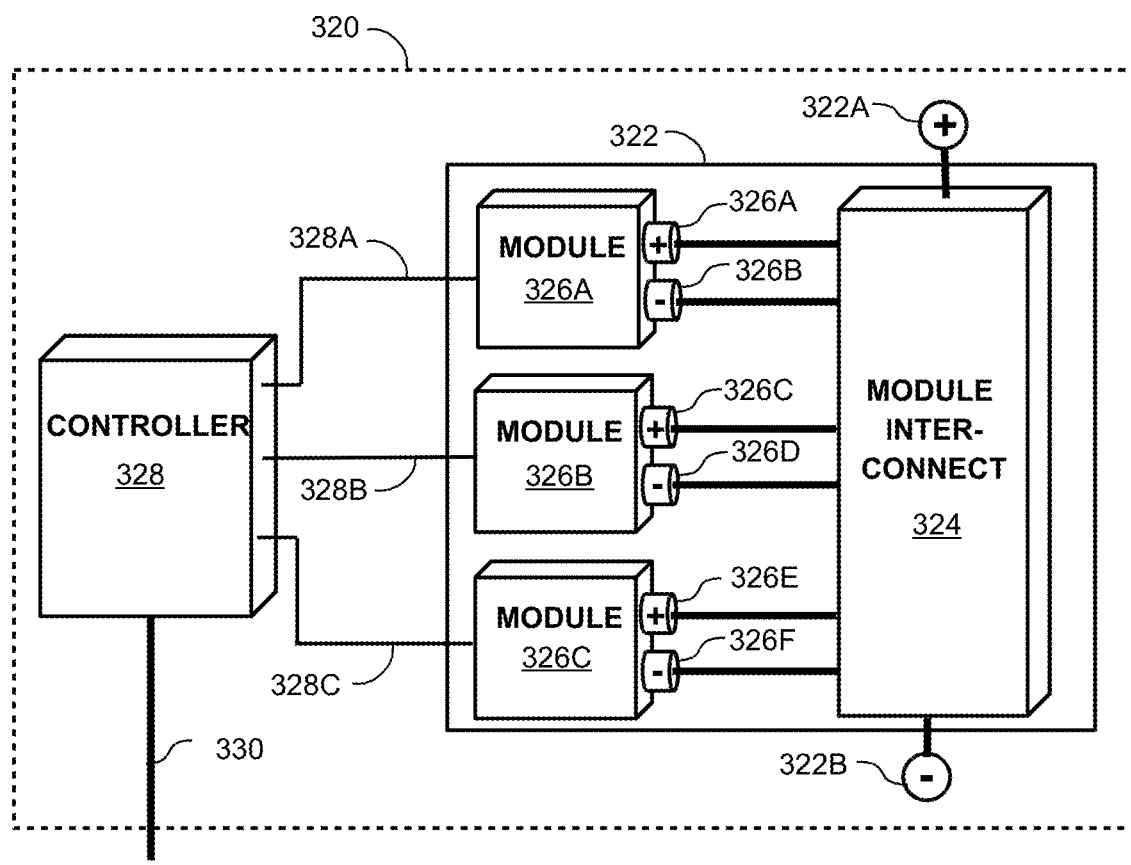
FIG. 3B illustrates an example battery system, according to aspects of the disclosure.

In FIG. 3A, battery module 300 comprises cell array 304, battery monitor system BMS 308, switch 310, and interface 314. Battery module 300 further comprises polarity terminals 302A and 302B (collectively, terminals 302). In embodiments, terminal 302A can be, for example, a positive voltage terminal and terminal 302B can be, for example, a negative voltage (or, alternatively, ground potential) terminal. Cell array 304 comprises battery cells 306A and 306B (collectively, cells 306), and polarity terminals 304A and 304B (collectively, terminals 304).

In an embodiment, a cell of a cell array, such as cells among 306 in cell array 304, can be an element of a battery module capable of storing electrical charge within, and/or delivering stored charge from, a battery module. While the example of FIG. 3A illustrates battery cell array 304 comprising two battery cells, it would be apparent to one of ordinary skill in the art that this does not limit embodiments and, in an embodiment, a battery module can comprise a single battery cell, a plurality of battery cells, and/or any other structure or configuration for storing charge in a battery module.

As shown in FIG. 3A, terminal 304A, of cell array 304, connects cell array 304 to positive terminal 302A of battery module 300, and terminal 304B connects cell array 304 to negative (or, alternatively ground) terminal 302B of battery module 300. In embodiments, such a configuration can enable cells, such as cells 306, of a cell array, such as 304, to receive charge from, and/or provide charge to, a battery via polarity terminals, such as terminals 302, of a battery.

BMS 308 is shown in FIG. 3A connected to cell array 304 by means of interface 316. In embodiments, interface 316 can be an interface for a battery management system, such as BMS 308, to receive status from cell array 304, such as, for example, a voltage of cell array 304 and/or one or more of cells 306; an instant level, and/or state, of electrical charge of cell array 304 and/or one or more of cells 306; a current flow through cell array 304 and/or one or more of cells 306; a power capacity of cell array 304 and/or one or more of cells 306; and/or a thermal property (e.g., a temperature) of cell array 304 and/or one or more of cells 306. In embodiments, interface 316 can be an interface for a battery management system, such as BMS 308, to control operations, and/or a status, of cell array 304 and/or one or more of cells 306, such as to control acceptance of electrical charge into, and/or transfer of electrical charge from, cell array 304 and/or one or more of cells 306, and/or to control a current flow through cell array 304 and/or one or more of cells 306.

FIG. 3A, further illustrates interface 314 comprising interface 314A, 314B, and 314C. Interface 314A illustrates an interface that, in an embodiment, can be utilized to communicate with BMS 308, such as to communicate status received from, and/or control information sent to, cell array 304 over interface 316. In an embodiment interface 314A can comprise, for example, one or more signal and/or data communications wires, and/or a wireless data communications interfaces, and can communicate, for example, states of battery module 300 and/or elements thereof, such as switch 310, cell array 304, and/or cells among cells 306.

While the example of FIG. 3A illustrates battery module 300 comprising a single BMS (308), a single cell array (i.e., 304), and a single instance of interface 316 connecting BMS 308 to cell array 304, it would be apparent to one of ordinary skill in the art that this does not limit embodiments and, in an embodiment, a battery module can comprise a plurality of BMS elements, a plurality of cell arrays, and/or a plurality of interfaces such as 316 interconnecting one or more battery management systems to one or more cell arrays. Similarly, in an embodiment comprising a plurality of BMS elements, such as 308, it would be apparent to one of ordinary skill in the art that a single instance of interface 314A or, alternatively, a plurality of instances of interface 314A can connect to one or more BMS elements included in a battery module, such as 300.

Interface 314B illustrates battery module 300 including a "presence detect" feature, which can be used, in an embodiment, by a battery system controller to detect the presence of battery module 300 within a battery. Presence detect feature 314B can be, for example, a wire connecting battery module 300 to an electronic circuit of a battery system, and/or a controller of a battery system. Such an electronic circuit can enable a controller of a battery system to detect the presence of battery module 300, in a battery or battery system, based on, for example, a current flow through, and/or a voltage across terminating ends 315 of interface 314B when battery module 300 is present in the battery or battery system.

Interface 314C illustrates an interface that, in an embodiment, can control a switch, such as illustrated by switch 310. For example, in an embodiment, and as shown in the example of FIG. 3A, switch 310 can operate to connect and/or disconnect terminal 304B of cell array 304 and terminal 302B of battery module 300. In an embodiment, connecting terminal 304B and terminal 302B, through switch 310, can connect cell array 304 and/or battery module 300 to a battery, or battery system, that includes battery module 300. Similarly, in an embodiment disconnecting terminal 304B and terminal 302B, through switch 310, can disconnect cell array 304, and/or battery module 300, from a battery, or battery system, that includes battery module 300.

While the example of FIG. 3A illustrates a single switch, 310, connecting cell array 304 to a polarity terminal (302B, in the example of FIG. 3A) of battery module 300, this is also not intended to limit embodiments. It would be apparent to one of ordinary skill in the art that a battery module can comprise a plurality of cell arrays, such as 304, and that such a battery module can connect, and/or disconnect, the cell arrays and the battery module using a single switch or, alternatively, using a plurality of switches, and that interface 314 can control the operation of one or more switches of a battery module using a single instance of interface 314C or, alternatively, using a plurality of instances of interface 314C.

In reference now to FIG. 3B, FIG. 3B illustrates an example battery system that, in an embodiment, can configure battery modules of a battery to produce particular properties of the battery, such as previously described, including a voltage and/or a power capacity of a battery. FIG. 3B illustrates example battery system 320 comprising battery 322 and controller 328. FIG. 3B further depicts battery 322 comprising battery modules 326A, 326B, and 326C (collectively, "modules 326"); polarity terminals 322A and 322B; and, module interconnect 324.

As further shown in FIG. 3B modules 326 are coupled (e.g., electrically connected) to module interconnect 324 by means of polarity terminals 326A, 326B, 326C, 326D, 326E, and 326F. In embodiments, coupling battery modules to module interconnect 324 can couple (e.g., electrically connect) modules 326 to the battery, and polarity terminals 322A and 322B can couple (e.g., electrically connect) battery 322 to a load. While not shown in FIG. 3B, in embodiments electrical series and/or parallel connections, for example, such as can be included in module interconnect 324, can couple modules among modules 326 to polarity terminals 322A and/or 322B.

In FIG. 3B, interfaces 328A, 328B, and 328C (collectively, "interfaces 328") couple modules 326A, 326B, and 326C, respectively, to controller 328. In embodiments, battery modules among modules 326, of FIG. 3B, can be modules similar to battery module 300 of FIG. 3A. Accordingly, in embodiments modules among modules 326 can include a battery management system, such as the example of BMS 308 in FIG. 3A and/or a switch, such as 310 in FIG. 3A, and interfaces among interfaces 328 can be interfaces similar to interface 314 of FIG. 3A. Interfaces among interfaces 328, and battery modules among modules 326, can include a presence detect feature, which can be similar to the example of presence detect feature 314B in FIG. 3A. In embodiments, controller 326 can use such a presence detect feature to detect that a particular battery module, among modules 326, is (or, is not) present (e.g., included) in battery 322. Such a presence detect feature can facilitate a battery, such as 322, being configurable, such as to add or remove one or more battery modules to modify a property of battery 322, such as a capacity (e.g., current and/or power capacity) of battery 322.

In an embodiment, controller 328 can receive status of battery modules, and/or elements thereof (e.g., a cell array and/or particular cells of a cell array) among modules 326, such as by means of an interface, such as similar to 314A of FIG. 3A, included in an interface among interfaces 328. Additionally, or alternatively, in an embodiment controller 328 can utilize an interface among interfaces 328 to configure battery modules of battery 322 to modify a property of battery 322, such as an electrical voltage of battery 322, and/or a capacity of battery 322 (e.g., current and/or power capacity).

For example, in an embodiment a controller, such as 328 in FIG. 3B, can utilize an interface between the controller and a battery module (e.g., 328A and 326A in FIG. 3B) to set a position of a switch (e.g., a switch similar to 310 in FIG. 3A, included in a module such as 326A in FIG. 3B) that electrically couples a battery module (e.g., electrically couples a polarity terminal of a battery module) to a battery, such as to electrically couple module 326A to, and/or de-couple module 326A from, battery 322 in FIG. 3B. While not shown in FIG. 3B, in embodiments interfaces among interfaces 328 can be additionally, or alternatively, coupled to module interconnect 324, and a controller, such as 328, can utilize such an interface to couple battery modules, such as modules 326, to, and/or de-couple battery modules, such as modules 326, from a battery. For example, in an embodiment, a module interconnect, such as 324, can include one or more switches (e.g., switches similar to switch 310 of FIG. 3A) that can electrically connect and/or disconnect a polarity terminal of or from a battery, such as 322, and controller 328 can utilize an interface to module interconnect 324 to set the position of the switches.

As previously described, in an embodiment a controller in a battery system, such as 328 in battery system 320, can use interfaces, such as the example of interfaces 314 in FIG. 3A and 328 in FIG. 3B, to receive state information from one or more battery modules of a battery (and/or the battery as a whole), to control operations of a battery module (such as among modules 326 in FIG. 3B), and/or to configure battery modules of a battery (such as modules 326 of battery 322) to produce particular properties of a battery. Such embodiments can, for example, perform a method such as method 100, in FIG. 1, and/or method 200, in FIG. 2.

Accordingly, in an embodiment a controller of a battery system, such as 328 in FIG. 3B, can configure battery modules of a battery, such as modules among modules 326, to modify properties of the battery, such as voltage, a thermal property, and/or a capacity, of the battery. To illustrate, using again the example of a lithium battery having a regulated power capacity of 100 Wh, in an embodiment battery 322 can be a lithium battery and each of battery modules 326 can have a rated power capacity less than 100 Wh. In such an embodiment, controller 328 can configure modules, among modules 326, in a rated capacity configuration of battery 322 to produce a cumulative 100 Wh, or more, of power capacity of battery 322, which can subject battery 322 to regulatory controls based on power capacity of lithium batteries. Alternatively, in such an embodiment controller 328 can configure modules, among modules 326, in a sub-capacity configuration of battery 322, to produce a cumulative power capacity of battery 322 less than 100 Wh, such that battery 322, in the sub-capacity configuration, is not subject to regulatory controls based on power capacity of lithium batteries.

As shown in FIG. 3B, in embodiments a controller can have an interface to communicate with elements other than elements of a battery, such as other elements of a battery system not illustrated by the example of FIG. 3B. In embodiments such an interface can comprise electronic signals and/or data communications, such as input and/or output wires having particular voltage states, and/or electronic signals (e.g., using wires and/or wireless signals) included in a data communications protocol. In an embodiment, a controller of a battery system can use an interface, such as illustrated in FIG. 3B by 330, to receive input information (inputs associated with, or from, a load) and/or output information (e.g., information indicating a status of a battery and/or particular modules of a battery).

For example, in embodiments controller 328 can utilize interface 330 to receive inputs indicating whether or not battery 322 (and/or battery system 320) is coupled to a load (e.g., that battery 322 is connected at terminals 322A and 322B to a load). Similarly, in embodiments, a controller can utilize an interface such as 330 to output to an indicator circuit, and/or computing element, information such as indicating a state of charge of a battery module or cell of a battery module, and/or a connection status of a battery module to a battery.

While not shown in detail in FIG. 3B, in embodiments, a controller in a battery system, such as 328 in FIG. 3B, can comprise an electronic circuit, a computing system, an element of a computing system, and/or a processor. An electronic circuit, in an embodiment, can comprise a circuit that can receive inputs, and/or transmit outputs, such as just described. For example, such an electronic circuit can receive an input, such a voltage state of an input wire, and the input can indicate whether the load is or is not coupled to the battery (and/or, to the battery system). In another example, in an embodiment, such a circuit can output information from a battery system, such as information indicating that one or more, or particular, battery modules of a battery are coupled to the battery, or can output information indicating a property or property of a battery, such as an instantaneous voltage, and/or a power capacity of a battery.

In an embodiment, a computing system, element of a computing system, and/or a processor, included in a controller, such as 328 in FIG. 3B, can comprise any form of general and/or special purpose computing system, computing system element, and/or processor. A controller can, in an embodiment, comprise a programmable processor or a fixed-program processor, and the processor can couple to an electronic circuit, such as a circuit to receive inputs and/or generate and/or communicate output information such as information just described for an electronic circuit of a controller to output. Such a processor, in an embodiment, can receive (and/or transmit) input information, and/or communicate output information, using an interface, such as 330, and/or from an electronic circuit of a controller such as just described.

In embodiments, a controller, such as 328, can process and/or respond to input information (e.g., electronic signals and/or data communications, such as just described) received over interfaces, such as interfaces 328 and/or 330, and/or can perform operations (such as operations of example methods 100 and 200 in FIGS. 1 and 2, respectively) to configure battery modules of a battery, such as 322.

For example, in an embodiment such as battery system 320, controller 328 can receive input information using interface 330, such as whether or not battery 322 is coupled (e.g., connected or disconnected at one or both of terminals 322A and 322B). Controller 328 can utilize the input information to, for example, perform operations of example method 100 of FIG. 1 and/or example method 200 of FIG. 2. Controller 328 can perform operations of the methods utilizing interfaces among interfaces 326, such as to control states of one or more switches, such as switches 310 included in battery modules among modules 326 (and/or switches not shown in FIG. 3B but that can be included in module interconnect 324) to connect the battery modules to, and/or disconnect the battery modules from, battery 322.

In another example, in an embodiment a load can comprise an element of a computing system (such as previously described) and the computing system element can communicate with a controller of a battery system to indicate to the controller that the battery (or, the battery system) is coupled (e.g., electrically connected) to the computing system element. Similarly, the computing system element can communicate with a controller of a battery system to indicate to the controller that the battery (or, the battery system) is de-coupled (e.g., electrically disconnected) from the computing system element. In this example, the absence of electronic signals and/or data communications between a controller and a computing system element, additionally or alternatively, can indicate to the controller that the battery is decoupled from the computing system element.

Accordingly, in an embodiment a battery system, such as 320, performing a method, such as example methods 100 of FIG. 1 and/or 200 of FIG. 2, can perform operations of the methods based on inputs received by a controller, such as 328, from the computing system element. Similarly, in an embodiment a battery system, such as 320, can perform operations of a method, such as example methods 100 of FIG. 1 and/or 200 of FIG. 2, based on inputs received from battery modules, such as modules among modules 326, using interfaces such as interfaces 326. As previously described, in response to such inputs, a battery system, such as 320, can perform operations of such methods by controlling, for example, states of switches, such as previously described, that can connect and/or disconnect battery modules and a battery.

Figure 4A:
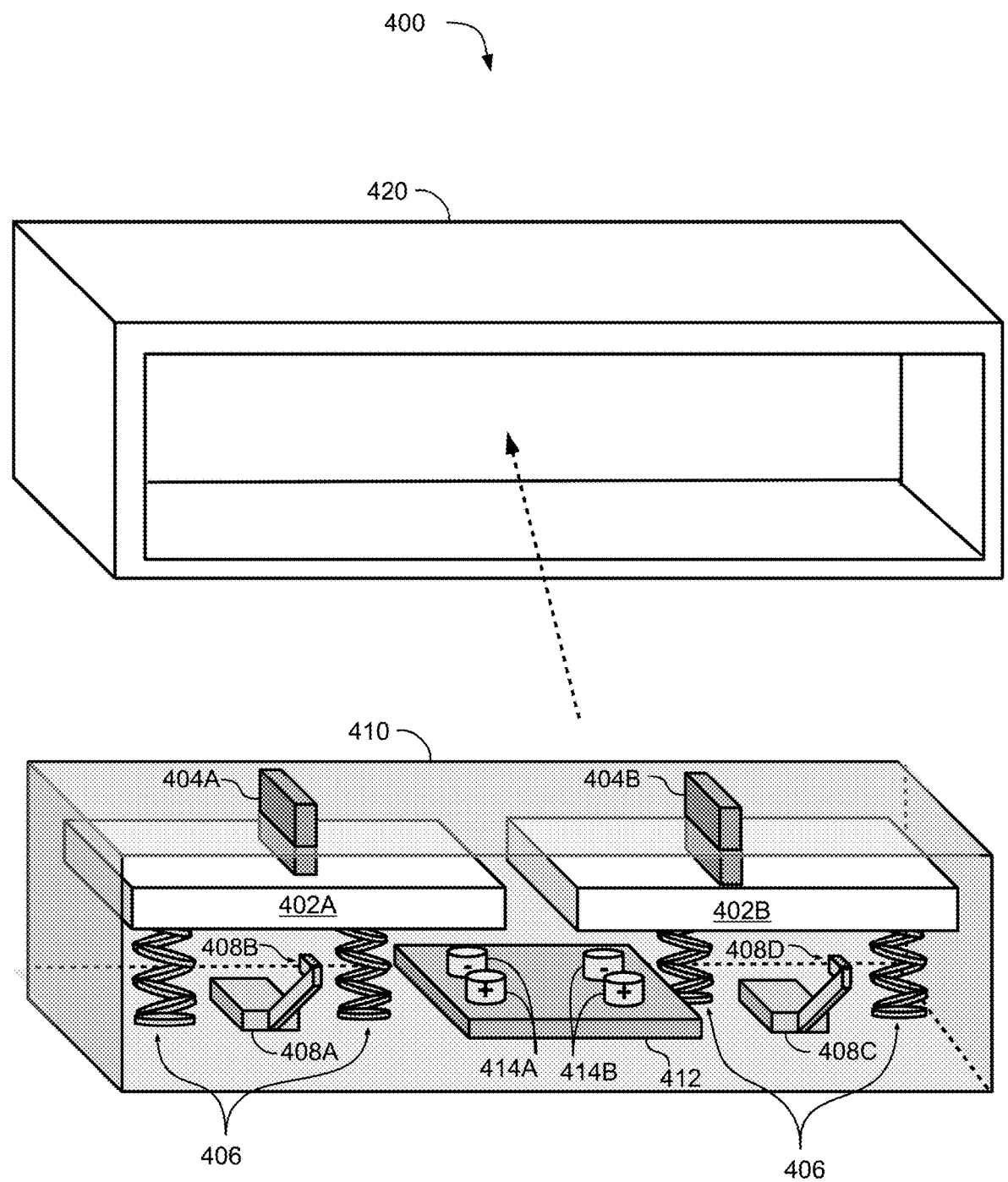
FIG. 4A illustrates an alternative example battery system, according to aspects of the disclosure.

FIG. 4A illustrates an alternative example embodiment of a battery system, which can mechanically configure battery modules of a battery system. In FIG. 4A, battery system 400 comprises battery 410 and battery enclosure 420. Battery 410, in FIG. 4A, comprises battery modules 402A and 402B (collectively, "modules 402"); module interconnect 412, springs 406; and, latches 408A and 408C (collectively, "latches 408"). Module interconnect 412 further comprises polarity terminals 414A and 414B (collectively, "terminals 414"), and battery modules 402A and 402B further comprise, respectively, actuators 404A and 404B (collectively, "actuators 404").

In embodiments, module interconnect 412 can couple and/or decouple (e.g., electrically connect and/or disconnect) battery modules 402A and/or 402B to and/or from each other and/or battery 410. For example, in an embodiment battery modules 402A and 402B can include polarity terminals (not shown in FIG. 4A) configured to electrically contact polarity terminals 414A and 414B, respectively, when battery modules 402A and/or 402B are in contact with module interconnect 412. Module interconnect 412, in an embodiment, can include electrical circuits (also not shown in FIG. 4A) that, when modules 402A and/or 402B (e.g., polarity terminals of the battery modules) are in contact with terminals among terminals 414, can couple battery modules 402A and/or 402B in series and/or parallel electrical connections to each other and/or battery 410. In an embodiment, an electrical circuit of module interconnect 412 can comprise, for example, one more polarity or power bus bars.

In embodiments, an actuator can position a battery module in and/or out of contact with a module interconnect. For example, in FIG. 4A, actuators 404A and 404B can have an "actuated" configuration (e.g., a position within a battery system) that presses battery modules 402A and 402B, respectively, downward within battery 410, to position battery modules 402A and/or 402B in contact with module interconnect 412. Similarly, in FIG. 4A, actuators 404A and 404B can have an "unactuated" configuration (e.g., an alternative position within a battery system) that does not position battery modules 402A and/or 402B in contact with module interconnect 412. For example, in an unactuated configuration actuators 404 can be configured to not press downward on battery modules 402A and/or 402B.

FIG. 4A illustrates springs 406 in an extended configuration such that the springs can position battery modules 402 and/or 402B out of contact with module interconnect 412. In embodiments, actuating (e.g., depressing) actuators 404A and 404B can position battery modules 402A and 402B, respectively, downward within battery 410, against springs 406, to compress springs among 406 and thereby position battery modules 402A and/or 402B in contact with terminals 414 of module interconnect 412 (e.g., to position polarity terminals of battery modules 402A and/or 402B in contact with polarity terminals 414A and/or 414B, respectively).

Module interconnect 412, with battery modules 402A and/or 402B in contact with polarity terminals 414A and/or 414B, can couple battery modules 402A and/or 402B to each other and/or battery 410. Similarly, module interconnect 412, with battery modules 402A and/or 402B positioned out of contact with polarity terminals 414A and/or 414B, can decouple battery modules 402A and/or 402B from each other and/or battery 410. In embodiments, actuators positioning battery modules in or out of contact with a module interconnect, such as in FIG. 4A actuators 404 positioning battery modules 402A and/or 40AB in and/or out of contact with module interconnect 412, can produce a load-capacity of a battery, such as a rated and/or sub-capacity of battery 410.

In embodiments, a battery system can actuate actuators, such as among actuators 404, by various mechanical means. For example, in an embodiment battery 410, in FIG. 4A, can be inserted into battery enclosure 420 (as indicated by the broken arrow from battery 410 to battery enclosure 420). In embodiments enclosure 420 can be designed such that inserting battery 410 into enclosure 420 depresses one or both of actuators 404A and 404B to position battery modules 402A and/or 40AB in contact with module interconnect 412. While inserted in enclosure 420, in embodiments actuators 404A and/or 404B can remain depressed and battery modules 402A and/or 402B can, correspondingly, remain in contact with module interconnect 412. In another example, in an embodiment actuators can be actuated by other mechanical means, such as a human or machine depressing, rotating, or otherwise manipulating an actuator.

In embodiments, a module retainer can maintain a battery module out of contact with a module interconnect when an actuator is in an unactuated configuration. For example, in FIG. 4A, springs 406 can operate as a module retainer to position battery modules 402A and/or 402B out of contact with module interconnect 412 when actuators 404A and/or 404B are in an unactuated configuration. In particular, FIG. 4A illustrates a configuration of battery modules 402 and springs 406 in which actuators 404A and 404B are in an unactuated configuration, such that springs 406 are extended and can mechanically prevent contact between battery modules 402 (e.g., polarity terminals of one or both battery modules) and module interconnect 412 (e.g., polarity terminals among terminals 414 of module interconnect 412).

A module retainer, such as springs 406, preventing a battery module, such as 402A or 402B, from having contact with a module interconnect, such as 412, can thereby de-couple (e.g., electrically disconnect) battery modules from each other and/or battery 410. In embodiments, a configuration of a battery, such as illustrated in FIG. 4A, can be, for example, a sub-capacity configuration of battery 410.

In an embodiment, as long as actuators, such as 404A and/or 404B, are actuated, battery modules, such as 402A and/or 402B, can remain in contact with a module interconnect, such as 412. However, as illustrated by latches 408 of example battery system 400 in FIG. 4A, in embodiments a module retainer can comprise additional or, alternative, mechanisms, to maintain battery modules of a battery in contact with a module interconnect, even with actuators in an unactuated configuration (or, configuration). Using the example of FIG. 4A, in an embodiment actuating (e.g., depressing) actuators 404A and/or 404B can position battery modules 402A and/or 402B in contact with interconnect module 412 and latches 408A and 408C, respectively, can secure the battery modules in contact with module interconnect 412. For example, in an embodiment latches 408A and/or 408C can be configured such that with springs 406 compressed, a projection of the latches, such as 408B or 408D of latches 408A and 40C, respectively, can "catch" upon battery module 402A and 402B and secure the battery module(s) in contact with module interconnect 412.

In embodiments, latches, such as 408A and/or 408C, can be released, such as by moving projections 408B and 408D laterally away from the upper surface of respective battery modules 402A and 402 in FIG. 4A. In embodiments, releasing the latches, when actuators (such as 404A and 404B) are not actuated, can then enable springs of a battery to break and/or prevent further contact between battery modules and a module interconnect.

While FIG. 4A illustrates battery 410 comprising two battery modules (402A and 402B), springs among 406 and latches among latches 408 associated with each of the two battery modules, configured to make contact with module interconnect 412, this is not intended to limit embodiments. It would be apparent to one of ordinary skill in the art that in an embodiment a battery can comprise a single battery module or, alternatively, a plurality of battery modules more than two modules, and associated springs and/or latches, similar to the example of battery 410, configured to make contact with a module interconnect or, alternatively, a plurality of module interconnects, and/or secure battery modules in contact with a module interconnect.

Similarly, while the description of FIG. 4A describes inserting battery 410 into enclosure 420 depressing both actuators 404A and 404B, this is also not intended to limit embodiments. It would be apparent to one of ordinary skill in the art that in embodiments an enclosure, and/or other manual and/or mechanical means can actuate (or, otherwise actuate) particular actuators independently of other actuators, such that a subset of the battery modules of a battery, and not necessarily all battery modules of the battery, a positioned in or out of contact with a module interconnect.

Figure 4B:
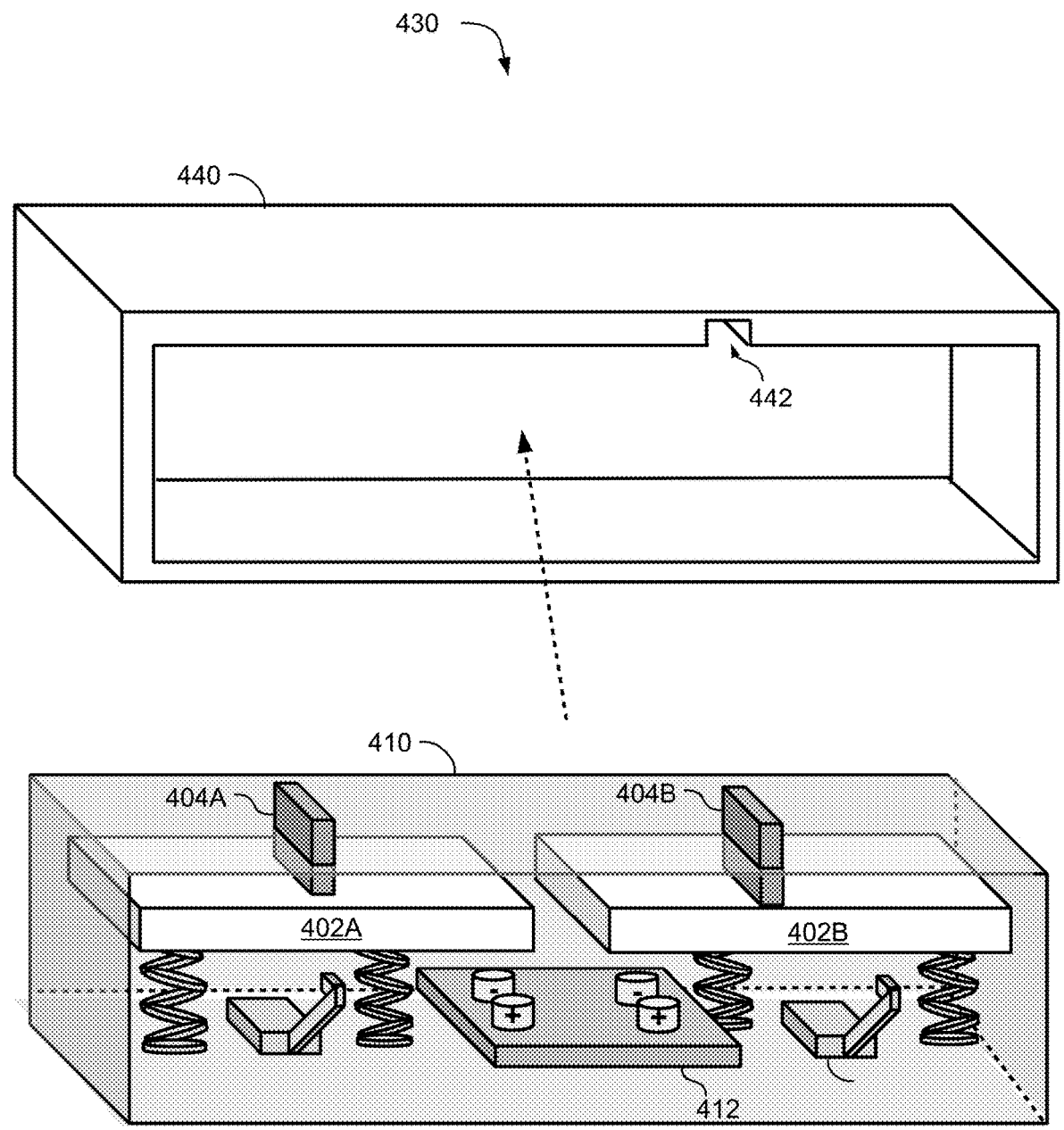
FIG. 4B illustrates a second alternative example battery system, according to aspects of the disclosure.

For example, FIG. 4B illustrates an example alternative enclosure, into which, in an embodiment, battery 410 of FIG. 4A can be inserted. In FIG. 4B, example battery system 430 includes battery 410, of FIG. 4A, and alternative enclosure 440 having slot 442. In an embodiment, inserting battery 410 into enclosure 440 can position actuator 404B into slot 442 such that, with battery 410 inserted into enclosure 440, enclosure 440 depresses actuator 404A, positioning module 402A in contact with module interconnect 412 while slot 442 does not depress actuator 404B, such that springs 406 prevent contact between battery module 402B and module interconnect 412 with battery 410 inserted into enclosure 440.

In embodiments an actuated configuration of actuators can position battery modules of a battery to make contact with, or otherwise couple to, a module interconnect to produce a rated capacity configuration. For example, with reference to FIG. 4A, battery 410 inserted into enclosure 410 can actuate (i.e., depress) actuators 404A and 404B to position both of battery modules 404A and 404B in contact with module interconnect 412, and such a configuration of battery 410 can comprise a rated capacity configuration of battery 410. Accordingly, enclosure 420 can be suitable, in embodiments, for coupling battery 410 to a load, with battery modules 402A and 402B of battery 410 configured to produce a rated power capacity of battery 410 (e.g., a power capacity of a lithium battery of 100 Wh or more) that can be necessary to provide power to the load.

Similarly, in embodiments an actuated configuration of actuators can position particular battery modules of a battery in contact with, or otherwise coupled to, a module interconnect to produce a sub-capacity of the battery. For example, with reference to FIG. 4B, in an embodiment battery 410 inserted into enclosure 440 can actuate actuator 404A to position module 402A in contact with module interconnect 412, while leaving actuator 404B in an unactuated configuration and module 402B out of contact with module interconnect 412. Such a configuration of the actuators can produce a sub-capacity configuration of battery 410. In an embodiment, such a sub-capacity configuration of battery 410 can be, for example, a power capacity less than a power capacity regulated for transport. Accordingly, enclosure 440 can be suitable, in embodiments, for transporting battery 410 at a power capacity less than a power capacity regulated for transport (e.g., a power capacity of a lithium battery less than 100 Wh).

While, in the examples of FIGS. 4A and 4B, actuators 404 in an actuated configuration depress battery modules 404 against springs 406 to position the battery modules in contact with module interconnect 412, and springs 406 operate, with actuators 404 in an unactuated configuration, as module retainers to position battery modules 404 out of contact with module interconnect 412, this is not intended to limit embodiments. Rather, it would be apparent to one of ordinary skill in that art that, in embodiments, various alternative forms of actuators and/or module retainers, or other means, can mechanically position a battery module in or out of contact with a module interconnect, or otherwise couple and/or decouple a battery module and other battery modules and/or a battery.

For example, in an alternative embodiment one or more battery modules can be configured in a battery in a fixed, or static position and, in this embodiment, actuators can position a module interconnect in or out of contact with the battery modules. For example, springs, such as 406, can operate on a module interconnect to prevent contact between the battery module(s) and the module interconnect, with an actuator (or, actuators) in an unactuated configuration. The actuator (or, actuators) in an actuated configuration can position the module interconnect, against the springs, to make contact with one or more battery modules of the battery (e.g., to make contact between polarity terminals of each of the battery module(s) and the module interconnect).

In another example, a module retainer can position battery module and/or a module interconnect rotationally, and/or angularly, relative each other. An actuator, in such an embodiment, can modify the rotational and/or angular position of one or more battery modules, and/or a module interconnect, to position battery modules in or out of contact with the module interconnect. For example, an actuator can comprise a knob coupled to one or more battery modules and/or a module interconnect. Rotating the knob into an actuated configuration can rotate a battery module (or, modules), and/or the module interconnect, to position the module(s) and/or module interconnect in contact with each other. Similarly, rotating the knob into an unactuated configuration can rotate a battery module (or, modules), and/or the module interconnect, to position the module(s) and/or module interconnect out of contact with each other.

In an alternative embodiment, a module retainer of a battery system can comprise one or more slide rails that can position one more battery modules, and/or a module interconnect, laterally in or out of contact with each other. An actuator can comprise a knob (or other means) that when moved (e.g., slid laterally) into an actuated configuration can position the module(s), and/or module interconnect, in contact with each other. Moving the actuator (e.g., sliding laterally) into an un actuated configuration can position the module(s), and/or module interconnect, out of contact with each other. In the unactuated configuration of the actuator, the rail(s) can maintain the module(s), and/or module interconnect, out of contact with each other.

Figure 5:
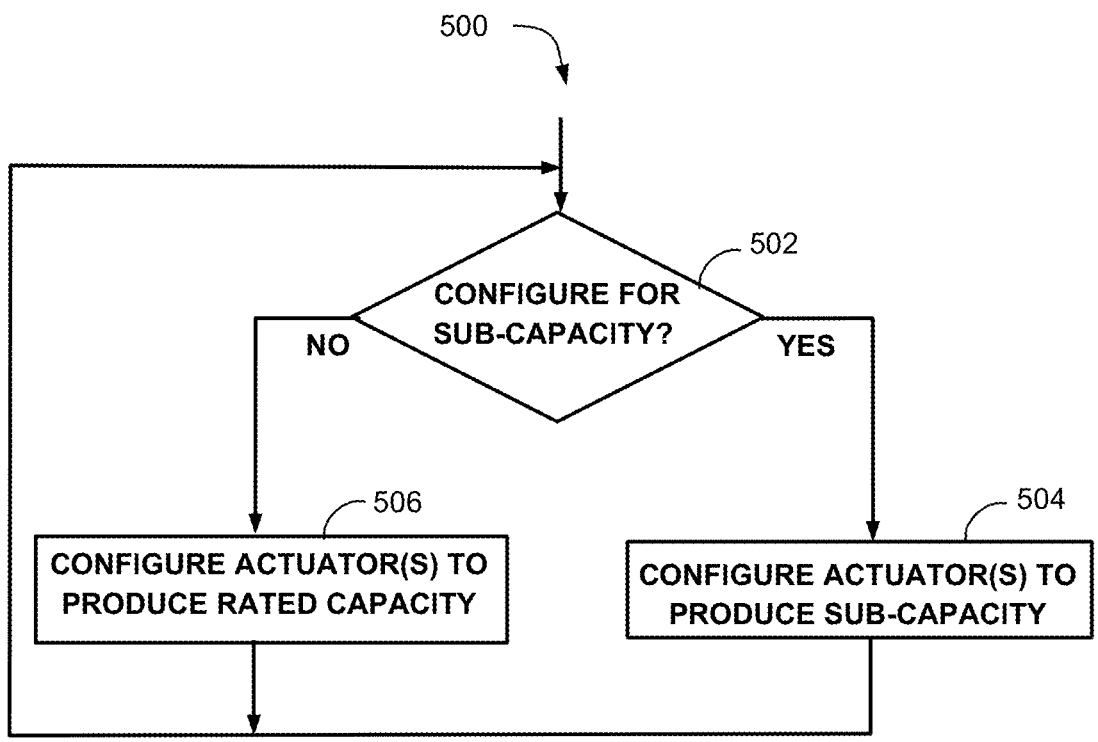
FIG. 5 illustrates a third example method to configure battery modules of a battery, according to aspects of the disclosure.

Embodiments can employ a method utilizing a battery system having actuators to configure battery modules of a battery, such as the examples of battery system 400 in FIG. 4A and 430 in FIG. 4B. FIG. 5 illustrates example method 500 to configure battery modules of a battery. Embodiments can perform a method such as example method 500, utilizing, for example, a battery system such as the examples of FIG. 4A and/or FIG. 4B, to install a battery in a system having a load to couple to the battery, to couple a battery to a load, to prepare a battery for transport, and/or to transport a battery. Similar to the description of example method 100, of FIG. 1, and example method 200, of FIG. 2, but also not intended to limit embodiments, example method 500 is described as performed by a battery system, which can include humans and/or mechanical elements (e.g., mechanical battery manufacturing elements) performing operations of the method.

At 502, the battery system determines whether or not to configure the battery in a sub-capacity configuration (e.g., a configuration having a capacity less than a rated or regulatory capacity). In embodiments, a battery system can determine, at 502, whether to configure the battery in a sub-capacity configuration based on various criteria. For example, in embodiments, at 502 the battery system can determine to configure the battery (and/or battery modules of a battery) in a sub-capacity configuration based on the battery being stored, prepared for storage and/or transport, under transport. Alternatively, or additionally, in embodiments at 502 the battery system can determine that the battery is not to be configured in a sub-capacity configuration based on the battery being prepared for installation in a system having a load to couple the battery, and/or coupled to a load.

In embodiments the battery system can receive inputs to apply the criteria at 502, such as inputs previously described in reference to FIG. 3B. For example, in embodiments at 502 a battery system can receive inputs from a load (and/or a system including a load) indicating that the battery is coupled to a load, inputs indicating a particular property and/or capacity of a load, and/or a property and/or capacity requirement of a battery (e.g., a minimum voltage and/or power capacity of a battery) required to provide power to, and/or to receive charge from a load, and/or a system that includes a load. In embodiments, inputs received by a battery system, to perform 502, can include instructions (e.g., written human language instructions, and/or computer-programmable instructions) to prepare a battery for transport, storage, installation, and/or coupling to a load.

Accordingly, at 502 of example method 500, if the battery system determines that the battery is not to be configured to have a sub-capacity, at 506 the battery system configures the actuators to position modules of the battery to produce a capacity of the battery greater than a sub-capacity, such as a rated capacity of the battery previously described. To illustrate, in an embodiment utilizing the examples of FIGS. 4A and 4B, at 506 the battery system can insert battery 410 into enclosure 420 of FIG. 4A, for example, to actuate (e.g., depress) both of actuators 404A and 404B and position battery modules 402A and 402B of battery 410 in contact with module interconnect 412. Both of battery modules 402A and 402B in contact with module interconnect 412 can, in combination, produce a rated capacity of the battery.

Alternatively, if at 502 the battery system determines that the battery is to be configured to have a sub-capacity, at 504 the battery system configures the actuators to position modules of the battery to produce a sub-capacity of the battery, such as a capacity less than a rated capacity. For example, at 504 the battery system inserting battery 410 into enclosure 440 of FIG. 4B can actuate (e.g., depress) actuator 404A but not actuate (e.g., not depress) actuator 404B, to position battery module 402A of battery 410 in contact with module interconnect 412, and to not position battery module 402B in contact with (and, springs 406 correspondingly maintaining 402B out of contact with) module interconnect 412. Battery module 402A in contact with module interconnect 412, and module 402B not in contact with module interconnect 412, can produce a sub-capacity of the battery.

In conjunction with, and/or subsequent to performing operations 504 and/or 506, at 502, the battery system can repeat determining whether or not the battery is to be configured for a sub-capacity. For example, in an embodiment, at 502 the battery system can determine that a battery coupled to a load and configured, at 506, to have a rated capacity has been decoupled (e.g., the battery removed from a system coupling it to a load) from the load and, accordingly, can be configured, at 504, in a sub-capacity configuration.

Conversely, in an embodiment, at 502 the battery system can determine that a battery previously not coupled to a load (e.g., a battery configured for transport) and configured, at 504, to have a sub-capacity, has been coupled to a load (e.g., removed from transport, and/or installed in a system coupling the battery to a load) and, accordingly, can be configured, at 506, in a rated capacity configuration. As described in reference to FIGS. 4A and 4B, in performing a method such as method 500, manipulating (actuating) an actuator can configure a battery (e.g., configure battery modules of a battery) to produce a rated and/or sub-capacity of the battery.

Figure 6:
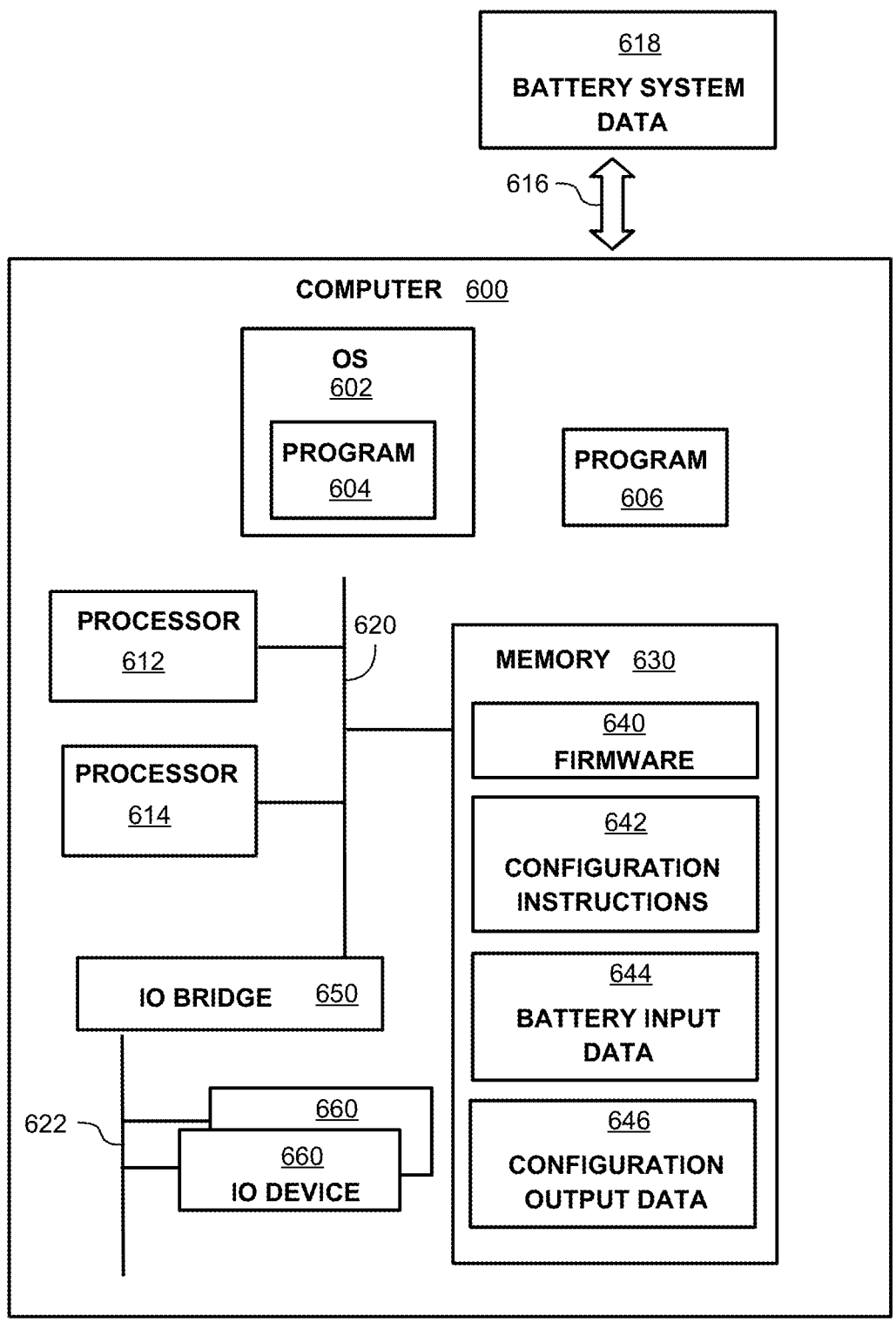
FIG. 6 illustrates a computer that can embody methods and structures of the disclosure.

FIG. 6 illustrates an example computing device, computer 600, such as can be included in an embodiment. For example, in an embodiment computer 600 can be included in a battery system (e.g., a controller of a battery system, such as 328 in FIG. 3B), a system to manufacture and/or configure a battery (e.g., a system to configure a battery for transport or installation in a system utilizing the battery), and/or a system coupled to and/or utilizing a battery.

Computer 600 includes interface 616, which in an embodiment can couple computer 600 to battery system data 618. In embodiments, battery system data 618 can comprise input data, output data, a source of input data, and/or recipient of output data associated with a battery, and/or a battery system. For example, battery system input data can comprise input data, such as previously described in reference to FIG. 3B, associated with battery modules, a load, and/or instructions to configure a battery. Battery system output data, in an embodiment, can comprise, for example, output signals and/or communications to configure modules of a battery, such as such as previously described in reference to FIG. 3B.

In embodiments interface 616 can enable computer 600 to, for example, receive or otherwise access input data, included in battery system data 618, and/or to present or otherwise communicate output data included in battery system data 618. In embodiments, interface 616 can comprise, and/or couple computer 600 to, for example, a network (e.g., an intranet, or a public network such as the Internet), or a storage medium, such as a disk drive internal to, or otherwise coupled to, computer 600.

Interface 616 can be configured to enable human input, to present output data to a human, and/or to couple computer 600 to other input and/or output devices, such as described further on herein in regard to components of computer 600. It would be apparent to one of ordinary skill in the art that the interface can be any of a variety of interface types or mechanisms suitable for a computer, or a program operating in a computer, to receive or otherwise access battery system input data, and/or to present or otherwise communicate battery system output data.

As shown in FIG. 6, computer 600 includes processors 612 and 614. In embodiments such processors can be a single processor or a multi-threaded processor, a general purpose or a special purpose processor, a co-processor, or any of a variety of processing devices that can execute computing instructions and/or perform operations of methods and structures of the disclosure.

In embodiments a computing device can include one or more memories and processors of a computing device can be coupled to the memories. FIG. 6 further illustrates processors included in computer 600 connected by memory interface 620 to memory 630. In embodiments a memory can be a cache memory, a main memory, a flash memory, or a combination of these or other varieties of electronic devices capable of storing information and, optionally, making the information, or locations storing the information within the memory, accessible to a processor. A memory, in an embodiment, can be formed of a single electronic (or, in some embodiments, other technologies such as optical) module or can be formed of a plurality of memory modules. A memory, and/or a memory module (e.g., an electronic packaging of a portion of a memory), in an embodiment can be, for example, one or more silicon dies or chips, or can be a multi-chip module package. Embodiments can organize a memory as a sequence of bytes, words (e.g., a plurality of contiguous or consecutive bytes), or pages (e.g., a plurality of contiguous or consecutive bytes or words).

A computing device, such as computer 600, in embodiments, can be coupled to one or more memories by a memory interface, such as 620 in FIG. 6. in an embodiment A memory interface between a processor (or, processors) and a memory (or, memories), such as 620, can be, for example, a memory bus common to one or more processors and one or more memories. In some embodiments, a memory interface, such as 620, between a processor and a memory can be point to point connection between the processor and the memory, and each processor in the computer can have a point-to-point connection to each of one or more of the memories. In other embodiments, a processor (for example, 612) can be connected to a memory (e.g., memory 630) by means of a connection (not shown) to another processor (e.g., 614) connected to the memory (e.g., 620 from processor 614 to memory 630).

In embodiments, a computing device, such as computer 600, can include an IO bridge, which can be connected to a memory interface, or (not shown), to a processor, for example. In some embodiments, an IO bridge can be a component of a processor or a memory. An IO bridge can interface the processors and/or memories of the computer (or, other devices) to IO devices connected to the bridge. For example, in FIG. 6 computer 600 includes IO bridge 650 interfacing memory interface 620 to IO devices, such as IO devices 660. In some embodiments, an IO bridge can connect directly to a processor or a memory or can be a component included in a processor or a memory. An IO bridge can be, for example, a Peripheral Component Interface Express (PCI-Express) or other IO bus bridge, or can be an IO adapter.

In embodiments an IO bridge can connect to IO devices by means of an IO interface, or IO bus, such as IO bus 622 of computer 600. For example, IO bus 622 can be a PCI-Express or other IO bus. In embodiments IO devices can be any of a variety of peripheral IO devices or IO adapters connecting to peripheral IO devices. For example, IO devices 660 can include a graphic card, keyboard or other input device, a hard drive or other storage device, a network interface cards, etc. IO devices 660 can include an IO adapter, such as a PCI-Express adapter, that connects components (e.g., processors or memories) of a computer to IO devices (e.g., disk drives, Ethernet networks, video displays, keyboards, mice, etc.).

In embodiments a computing device can include instructions executable by one or more processors (or, processing elements, such as threads of a processor). The instructions can be a component of one or more programs. The programs, or the instructions, can be stored in, and/or utilize, one or more memories of a computer. As illustrated in the example of FIG. 6, computer 600 includes a plurality of programs, such as program 604 and program 606. In an embodiment a program can be, for example, an application program, an operating system or a function of an operating system, or a utility or built-in function of a computer. A program can be a hypervisor, and the hypervisor can, for example, manage sharing resources of the computer (e.g., a processor or regions of a memory, or access to an IO device) among a plurality of programs or OSes. A program can be a program that embodies the methods, or portions thereof, of the disclosure. For example, in an embodiment a program can be a program that executes on a processor of computer 600 to perform operations of method 100 of FIG. 1 and/or method 200 of FIG. 2.

In embodiments, programs can be "stand-alone" programs, and such stand-alone programs can execute on processors and use memory within a computing device directly, without requiring another program to control their execution or their use of resources of the computing device. For example, in FIG. 6 computer 600 includes stand-alone program 606. In an embodiment a stand-alone program can perform particular functions within the computer, such as controlling, or interfacing (e.g., access by other programs) an IO interface or IO device. A stand-alone program can, for example, manage the operation, or access to, a memory. A Basic I/O Subsystem (BIOS), or a computer boot program (e.g., a program that can load and initiate execution of other programs) can be a standalone program.

In embodiments a computing device can include one or more operating systems, and an operating system can control the execution of other programs such as, for example, to start or stop a program, or to manage resources of the computer used by a program. For example, computer 600 includes operating systems (OS) 602, which can include, or manage execution of, one or more programs, such as OS 602 including (or, managing) program 604. In some embodiments, an operating system can function as a hypervisor.

A program can be embodied as firmware (e.g., BIOS in a desktop computer, or a hypervisor) and the firmware can execute on one or more processors and, optionally, can use memory, included in the computer. Firmware can be stored in a memory (e.g., a flash memory) of the computer. For example, computer 600 includes firmware 640 stored in memory 630. In other embodiments, firmware can be embodied as instructions (e.g., comprising a computer program product) on a storage medium (e.g., a CD ROM, a flash memory, or a disk drive), and the computer can access the instructions from the storage medium.

In embodiments, a memory of, or coupled to, a computing device can store instructions executable by a processor of a computing device. For example, as illustrated in FIG. 6 memory 630 includes firmware 640 and battery configuration instructions 642. In embodiments firmware 640 and/or battery configuration instructions 642 can include instructions executable by processors of computer 600, such as 612 and/or 614, and the instructions can cause the processors to perform operations of methods such as example methods 100, of FIG. 1, and/or 200, of FIG. 2.

In embodiments, a memory of, and/or coupled to, a computing device can store input data, such as can be used by the instructions. For example, as also shown in FIG. 6, memory 630 includes battery input data 644. In an embodiment, battery input data 644 can include data (e.g., data included in battery system data 618) used by configuration instructions 642 in performing operations of methods of the disclosure, such as example methods 100 and/or 200.

Similarly, in an embodiment a memory of, and/or coupled to, a computing device can store output data, such as the results of executing the instructions. As illustrated in FIG. 6, memory 630 includes configuration output data 646, which can comprise, in an embodiment, the results of executing instructions, such as instructions included in programs 604 and/or 606, firmware 640, and/or configuration instructions 642.

The example of computer 600 is not intended to limit embodiments. In embodiments, a computing device, such as computer 600, can include a plurality of processors and/or interfaces not shown in FIG. 6, and can include other elements or components, such as networks, network routers or gateways, storage systems, server computers, virtual computers or virtual computing and/or IO devices, cloud-computing environments, and so forth. It would be evident to one of ordinary skill in the art to include a variety of computing devices interconnected in a variety of manners in a computing device and/or computing system embodying aspects and features of the disclosure.

For example, with reference again to FIG. 6, in embodiments computer 600 can be a desktop or laptop computer; a tablet computer, mobile computing device, or cellular phone; or, a server computer, a high-performance computer, or a super computer. Computer 600 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one of ordinary skill in the art that a computing device, and/or computing system, embodying aspects and features of the disclosure can be any of a variety of computing devices having processors and, optionally, memories and/or programs.

The present disclosure can be embodied in a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. A computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network such as, for example, the Internet, a local area network, a wide area network, and/or a wireless network. The network can comprise copper transmission cables, optical transmission fibers, wireless transmission, routers, firewalls, switches, gateway computers and/or edge servers. The network adapter card or network interface in each computing/processing device can receive computer readable program instructions from the network and can forward the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages.

The computer readable program instructions can execute entirely on a user's computer, partly on a user's computer, as a stand-alone software package, partly on a user's computer and partly on a remote computer, or entirely on a remote computer or server. In the latter scenario, the remote computer may be connected to a user's computer through any type of network, including a local area network (LAN) or a wide area network (WAN), or the connection may be made to an external computer (for example, through the Internet using an Internet Service Provider). In embodiments, electronic circuitry—including, for example, programmable logic circuitry, field-programmable gate arrays (FPGA), or programmable logic arrays (PLA)—can execute the computer readable program instructions by utilizing state information of the computer readable program instructions to personalize the electronic circuitry, in order to perform aspects of the disclosure.

Aspects of the present disclosure are described herein with reference to flowchart illustrations and/or block diagrams of methods, apparatus (systems), and computer program products according to embodiments of the invention. It will be understood by one of ordinary skill in the art that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which can comprise one or more executable instructions for implementing the specified logical function(s). In alternative implementations, the functions noted in the blocks can occur out of the order noted in the Figures. For example, two blocks shown in succession can, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, the method comprising:
monitoring, by a battery controller, first load-states of a battery, the battery configured to enable the battery controller to selectively connect and disconnect, respectively to and from the battery, battery modules among a plurality of battery modules installed internal to the battery;
determining, by the battery controller, based on the monitoring the first load-states of the battery, that the battery is in a disconnected load-state;
in response to the determining that the battery is in the disconnected load-state, selecting, by the battery controller, from among the plurality of battery modules, a first and a second set of battery modules, the first and the second set of battery modules selected to produce, while the battery is in the disconnected load-state, a power capacity of the battery less than a rated power capacity of the battery, the first set of battery modules selected to connect to the battery, the second set of battery modules selected to disconnect from the battery; and
further in response to the determining that the battery is in the disconnected load-state, the battery controller configuring the first set of battery modules to be connected to the battery, and configuring the second set of battery modules to be disconnected from the battery, to produce, while the battery is in the disconnected load-state, the power capacity of the battery less than the rated power capacity of the battery.

2. The method of claim 1, wherein each battery module included in the plurality of battery modules includes a respective presence detect feature; and,
wherein the method of the battery controller determining the first and the second set of battery modules comprises the battery controller determining the first and second set of battery modules based, at least in part, on the respective presence detect feature included in each battery module included in the first and the second set of battery modules.

3. The method of claim 1, the method further comprising:
monitoring, by the battery controller, responsive to the battery in the disconnected load-state, second load-states of the battery;
determining, by the battery controller, based on the monitoring the second load-states, that the battery has transitioned from the disconnected load-state to a connected load-state of the battery;
in response to the determining that the battery has transitioned to the connected load-state, selecting, by the battery controller, from among the plurality of battery modules, a third set of battery modules, the third set of battery modules selected to connect to the battery to produce a power capacity of the battery not less than the rated power capacity of the battery; and,
further in response to the determining that the battery has transitioned to the connected load-state, the battery controller configuring the third set of battery modules to be connected to the battery.

4. The method of claim 3, the method further comprising:
detecting, by the battery controller, a battery module, among the plurality of battery modules and connected to the battery, in a low capacity state; and,
responsive to the detecting the battery module in the low capacity state, the battery controller configuring the battery module in the low capacity state to be disconnected from the battery.

5. The method of claim 4, the method further comprising the battery controller configuring, based on the detecting the battery module in the low capacity state, a fourth set of battery modules, among the plurality of battery modules, to be connected to a power source to charge battery modules included in the fourth set of battery modules.

6. The method of claim 4, the method further comprising configuring, by the battery controller, based on the detecting the battery module in low capacity state, a fourth set of battery modules, among the plurality of battery modules, to be disconnected from the battery.

7. The method of claim 3, wherein the connected load-state comprises the battery coupled to a load selected from a group consisting of: a computer or computing device; a computing system; a power system of a computer or computing system; a power inverter; an electrically powered vehicle; an electric motor; and, an electric generator.

8. The method of claim 1, wherein the power capacity of the battery less than the rated power capacity of the battery comprises a power capacity of the battery less than a regulatory limit.

9. The method of claim 8, wherein the regulatory limit corresponds to a power capacity selected from a group comprising a power capacity of the battery to safely store that battery and a power capacity of the battery to safely transport the battery.

10. The method of claim 1, wherein the disconnected load-state is associated with the battery configured for storage or transport.

11. A battery system, the battery system comprising:
 a battery;
 a plurality of battery modules installed internal to the battery; and,
 a battery controller, wherein the battery controller is configured to:
 selectively connect and disconnect, respectively to and from the battery, battery modules among the plurality of battery modules;
 monitor first load-states of the battery;
 determine, based on the monitoring the first load-states of the battery, that the battery is in a disconnected load-state;
 select, in response to the determining that the battery is in the disconnected load-state, from among the plurality of battery modules, a first and a second set of battery modules, the first and the second set of battery modules selected to produce, while the battery is in the disconnected load-state, a power capacity of the battery less than a rated power capacity of the battery, the first set of battery modules selected to connect to the battery, the second set of battery modules selected to disconnect from the battery; and,
 configure, further in response to the determining that the battery is in the disconnected load-state, the first set of battery modules to be connected to the battery and the second set of battery modules to be disconnected from the battery to produce, while the battery is in the disconnected load-state, the power capacity of the battery less than the rated power capacity of the battery.

12. The battery system of claim 11, wherein
 each of the plurality of battery modules includes a respective presence detect feature; and,
 wherein the battery controller configured to determine the first and the second set of battery modules comprises the battery controller further configured to determine the first and second set of battery modules based, at least in part, on the respective presence detect feature included in each battery module included in the first and the second set of battery modules.

13. The battery system of claim 11, wherein the battery controller is further configured to:
 monitor, responsive to the battery in the disconnected load-state, second load-states of the battery;
 determine, based on the monitoring the second load-states, that the battery has transitioned from the disconnected load-state to a connected load-state of the battery;
 in response to the determining that the battery has transitioned to the connected load-state, select, from among the plurality of battery modules, a third set of battery modules, the third set of battery modules selected to connect to the battery to produce a power capacity of the battery not less than the rated power capacity of the battery; and,
 further in response to the determining that the battery has transitioned to the connected load-state, configure the third set of battery modules to be connected to the battery.

14. The battery system of claim 13, wherein the battery controller is further configured to:
 detect a battery module, among the plurality of battery modules and connected to the battery, in a low capacity state; and,
 responsive to the detecting the battery module in the low capacity state, configure the battery module in the low capacity state to be disconnected from the battery.

15. The battery system of claim 14, wherein the battery controller is further configured to configure, based on the detecting the battery module in the low capacity state, a fourth set of battery modules, among the plurality of battery modules, to be disconnected from the battery.

16. The battery system of claim 14, wherein the battery controller is further configured to configure, based on the detecting the battery module in the low capacity state, a fourth set of battery modules, among the plurality of battery modules, to be connected to a power source to charge battery modules included in the fourth set of battery modules.

17. The battery system of claim 13, wherein the connected load-state comprises the battery coupled to a load selected from a group consisting of: a computer or computing device; a computing system; a power system of a computer or computing system; a power inverter; an electrically powered vehicle; an electric motor; and, an electric generator.

18. The battery system of claim 11, wherein the power capacity of the battery less than the rated power capacity of the battery comprises a power capacity of the battery less than a regulatory limit.

19. The battery system of claim 18, wherein the regulatory limit corresponds to a power capacity selected from a group comprising a power capacity of the battery to safely store that battery and a power capacity of the battery to safely transport the battery.

* * * * *